US007666088B2

(12) United States Patent
Cannon

(10) Patent No.: US 7,666,088 B2
(45) Date of Patent: Feb. 23, 2010

(54) METHODS AND APPARATUS FOR PLAYING A GAMING POOL FOR A FEATURE EVENT BONUS GAME

(75) Inventor: Lee E. Cannon, Bozeman, MT (US)

(73) Assignee: IGT, Reno, NV (US)

(*) Notice: Subject to any disclaimer, the term of this patent is extended or adjusted under 35 U.S.C. 154(b) by 398 days.

(21) Appl. No.: 10/951,414

(22) Filed: Sep. 28, 2004

(65) Prior Publication Data

US 2006/0073870 A1 Apr. 6, 2006

(51) Int. Cl.
*A63F 13/00* (2006.01)

(52) U.S. Cl. ............................ 463/25; 463/16; 463/17; 463/18; 463/19; 463/20

(58) Field of Classification Search ............ 463/16–23, 463/40–42

See application file for complete search history.

(56) References Cited

U.S. PATENT DOCUMENTS 4,191,376 A * 3/1980 Goldman et al. ............ 273/139
4,339,798 A 7/1982 Hedges et al. .............. 364/412
4,582,324 A 4/1986 Koza et al. .................. 273/138
4,669,731 A 6/1987 Clarke ........................ 273/143
4,679,143 A 7/1987 Hagiwara .................. 364/412
4,695,053 A 9/1987 Vazquez, Jr. et al. ........ 273/143
4,817,951 A 4/1989 Crouch et al. ............... 273/143
4,837,728 A 6/1989 Barrie et al. ................ 364/412
4,856,787 A 8/1989 Itkis ........................... 273/237
4,871,171 A 10/1989 Rivero ........................ 273/138
5,083,271 A 1/1992 Thacher et al. ............. 364/411
5,152,529 A 10/1992 Okada ........................ 273/143
5,186,460 A 2/1993 Fongeallaz et al. ............. 263/6
5,242,163 A 9/1993 Fulton ......................... 273/85
5,265,874 A 11/1993 Dickinson et al. ............. 463/25
5,275,400 A 1/1994 Weingardt et al. ............ 463/12
5,288,081 A 2/1994 Breeding .................... 273/292
5,290,033 A 3/1994 Bittner et al. ............... 273/138
5,333,868 A 8/1994 Goldfarb ..................... 463/18

(Continued)

FOREIGN PATENT DOCUMENTS

NZ 508626 12/2000

(Continued)

OTHER PUBLICATIONS

Scarne, Scarne's New Complete Guide to Gambling, Slmon & Schuster, pp. 162-167 (1974).

(Continued)

*Primary Examiner*—Ronald Laneau
*Assistant Examiner*—Ross A. Williams
(74) *Attorney, Agent, or Firm*—K&L Gates LLP

(57) ABSTRACT

A bonus controller is provided for managing a feature event bonus game in a gaming system, having a processor and a memory, wherein the bonus controller is programmed to assign an entry to a player associated with a first gaming apparatus from a plurality of entries defining a gaming pool for the feature event when the player obtains a qualifying win at one of a number of casino games. The bonus controller is also programmed to determine an outcome of the feature event bonus game and determine if at least one winner exists based on the outcome as well as identify the winner of the feature event.

47 Claims, 18 Drawing Sheets

U.S. PATENT DOCUMENTS

| | | | | |
|---|---|---|---|---|
| 5,351,970 | A | 10/1994 | Fioretti | 463/19 |
| 5,393,057 | A | 2/1995 | Marnell, II | 273/85 |
| 5,397,125 | A | 3/1995 | Adams | 273/138 |
| 5,417,430 | A | 5/1995 | Breeding | 273/292 |
| 5,472,197 | A | 12/1995 | Gwiasda et al. | 273/143 |
| 5,544,892 | A | 8/1996 | Breeding | 273/292 |
| 5,560,603 | A | 10/1996 | Seelig et al. | 463/6 |
| 5,564,701 | A | 10/1996 | Dettor | 463/16 |
| 5,580,309 | A | 12/1996 | Piechowiak et al. | 463/16 |
| 5,645,486 | A | 7/1997 | Nagao et al. | 463/27 |
| 5,655,961 | A | 8/1997 | Acres et al. | 463/27 |
| 5,664,998 | A | 9/1997 | Seelig et al. | 463/20 |
| 5,758,875 | A | 6/1998 | Giacalone, Jr. | 273/143 |
| 5,761,647 | A | 6/1998 | Boushy | 705/10 |
| 5,769,716 | A | 6/1998 | Saffari et al. | 463/20 |
| 5,779,242 | A | 7/1998 | Kaufmann | 273/459 |
| 5,779,544 | A | 7/1998 | Seelig et al. | 463/6 |
| 5,779,549 | A | 7/1998 | Walker et al. | 463/42 |
| 5,806,045 | A | 9/1998 | Biorge et al. | 705/14 |
| 5,816,918 | A | 10/1998 | Kelly et al. | 463/16 |
| 5,820,460 | A | 10/1998 | Fulton | 463/13 |
| 5,823,874 | A | 10/1998 | Adams | 463/17 |
| 5,833,536 | A | 11/1998 | Davids et al. | 463/11 |
| 5,851,148 | A | 12/1998 | Burne et al. | 463/25 |
| D404,436 | S | 1/1999 | McGahn et al. | D21/370 |
| 5,855,515 | A | 1/1999 | Pease et al. | 463/27 |
| 5,876,284 | A | 3/1999 | Acres et al. | 463/25 |
| 5,902,184 | A | 5/1999 | Bennett | 463/13 |
| 5,902,983 | A | 5/1999 | Crevelt et al. | 235/380 |
| 5,911,418 | A | 6/1999 | Adams | 273/274 |
| 5,919,088 | A | 7/1999 | Weiss | 463/9 |
| 5,924,927 | A | 7/1999 | Matsuura et al. | 463/62 |
| 5,935,000 | A | 8/1999 | Sanchez, III et al. | 463/17 |
| 5,941,772 | A | 8/1999 | Paige | 463/20 |
| 5,947,820 | A | 9/1999 | Morro et al. | 463/9 |
| 5,951,397 | A | 9/1999 | Dickinson | 463/36 |
| 5,976,015 | A | 11/1999 | Seelig et al. | 463/6 |
| 5,980,384 | A | 11/1999 | Barrie | 463/16 |
| 5,993,316 | A | 11/1999 | Coyle et al. | 463/25 |
| 5,997,400 | A | 12/1999 | Seelig et al. | 463/6 |
| 6,012,982 | A | 1/2000 | Piechowiak et al. | 463/16 |
| 6,012,983 | A | 1/2000 | Walker et al. | 463/20 |
| 6,019,374 | A | 2/2000 | Breeding | 273/292 |
| 6,024,643 | A | 2/2000 | Begis | 463/42 |
| 6,039,648 | A | 3/2000 | Guinn et al. | 463/16 |
| 6,050,895 | A | 4/2000 | Luciano et al. | |
| 6,077,162 | A | 6/2000 | Weiss | 463/26 |
| 6,082,887 | A | 7/2000 | Feuer et al. | 364/410.1 |
| 6,089,975 | A | 7/2000 | Dunn | 463/16 |
| 6,089,976 | A | 7/2000 | Schneider et al. | 463/16 |
| 6,092,806 | A | 7/2000 | Follis | 273/138.1 |
| 6,102,400 | A | 8/2000 | Scott et al. | 273/269 |
| 6,110,043 | A | 8/2000 | Olsen | 463/27 |
| 6,113,098 | A | 9/2000 | Adams | 273/143 |
| 6,120,378 | A | 9/2000 | Moody et al. | 463/20 |
| 6,128,550 | A | 10/2000 | Heidel et al. | 700/232 |
| 6,135,885 | A | 10/2000 | Lermusiaux | 463/20 |
| 6,146,273 | A | 11/2000 | Olsen | 463/27 |
| 6,159,095 | A | 12/2000 | Frohm et al. | 463/19 |
| 6,159,097 | A | 12/2000 | Gura | 463/20 |
| 6,162,122 | A | 12/2000 | Acres et al. | 463/29 |
| 6,165,071 | A | 12/2000 | Weiss | 463/24 |
| 6,165,072 | A | 12/2000 | Davis et al. | 463/29 |
| 6,168,521 | B1 | 1/2001 | Luciano et al. | 463/18 |
| 6,186,893 | B1 | 2/2001 | Walker et al. | 463/20 |
| 6,190,255 | B1 | 2/2001 | Thomas et al. | 463/20 |
| 6,193,606 | B1 | 2/2001 | Walker et al. | 463/20 |
| 6,193,607 | B1 | 2/2001 | Kay | 463/22 |
| 6,203,010 | B1 | 3/2001 | Jorasch et al. | 273/138.1 |
| 6,203,429 | B1 | 3/2001 | Demar et al. | 463/20 |
| 6,206,782 | B1 | 3/2001 | Walker et al. | 463/25 |
| 6,210,275 | B1 | 4/2001 | Olsen | 463/16 |
| 6,210,277 | B1 | 4/2001 | Stefan | 463/27 |
| 6,224,482 | B1 | 5/2001 | Bennett | 463/20 |
| 6,224,484 | B1 | 5/2001 | Okuda et al. | 463/27 |
| 6,224,486 | B1 | 5/2001 | Walker et al. | 463/42 |
| 6,231,445 | B1 | 5/2001 | Acres | 463/42 |
| 6,234,892 | B1 | 5/2001 | Geyer et al. | 454/188 |
| 6,238,287 | B1 | 5/2001 | Komori et al. | 463/20 |
| 6,287,202 | B1 | 9/2001 | Pascal et al. | 463/42 |
| 6,309,299 | B1 | 10/2001 | Weiss | 463/20 |
| 6,309,307 | B1 | 10/2001 | Krause et al. | 473/274 |
| 6,364,765 | B1 | 4/2002 | Walker et al. | 463/16 |
| 6,375,567 | B1 | 4/2002 | Acres | 463/25 |
| 6,508,709 | B1 | 1/2003 | Karmarkar | 463/42 |
| 6,786,824 | B2 | 9/2004 | Cannon | 463/42 |
| 6,893,342 | B1 * | 5/2005 | Singer et al. | 463/20 |
| 7,326,115 | B2 | 2/2008 | Baerlocher | |
| 2002/0039923 | A1 * | 4/2002 | Cannon et al. | 463/42 |
| 2002/0177483 | A1 | 11/2002 | Cannon | |
| 2003/0060264 | A1 | 3/2003 | Chilton et al. | 463/20 |
| 2003/0104854 | A1 * | 6/2003 | Cannon | 463/16 |
| 2003/0119576 | A1 * | 6/2003 | McClintic et al. | 463/20 |
| 2003/0119581 | A1 * | 6/2003 | Cannon et al. | 463/25 |
| 2004/0033831 | A1 | 2/2004 | Tarantino | |
| 2004/0227293 | A1 * | 11/2004 | Piccoli et al. | 273/292 |
| 2004/0235542 | A1 * | 11/2004 | Stronach et al. | 463/6 |
| 2008/0119283 | A1 | 5/2008 | Baerlocher | |

FOREIGN PATENT DOCUMENTS

| | | |
|---|---|---|
| WO | WO 098/00210 | 1/1998 |
| WO | WO 98/51384 | 11/1998 |
| WO | WO 00/20082 | 4/2000 |
| WO | WO 03/049053 | 11/2002 |
| WO | WO 02/096528 | 12/2002 |
| WO | WO 2005/010834 | 7/2004 |

OTHER PUBLICATIONS

Take Your Pick, Strictly Slots (Mar. 2001).
Instant Slotto, Strictly Slots (Apr. 2001).
EZ-Pay Ticket System Brochures, IGT (2000).
IGT Gaming System Brochures, IGT (at least 2001).
Raining Diamonds Advertisement, Sierra Design Group (2001).
Silver Strike Advertisement and Pictures, Anchor Gaming (1997).

* cited by examiner

METHODS AND APPARATUS FOR PLAYING A GAMING POOL FOR A FEATURE EVENT BONUS GAME

TECHNICAL FIELD

The present description relates generally to gaming units. More specifically, the present description relates to gaming methods, units, and systems wherein a gaming pool is used as a bonus game.

BACKGROUND

Gaming establishments are continually searching for new gaming systems to hold the attention of players. By developing new games, the gaming establishments hope to pique existing players' interests in continued wagering and to attract new players. If players lose interest in a gaming unit, they typically will stop playing that game, which causes the gaming unit to be idle and not contribute to the revenue of the casino. In addition, interested players may tend to be more active and consistent in the play of their respective units and consequently tend to play faster, thus enhancing the potential profit of the unit.

To keep and increase players' interest in gaming, the gaming industry has added bonus games to many of its games, including, for example, mechanically rotatable reel and video slot machines. A bonus game is typically a secondary game that is activated when a specific outcome occurs in a primary or standard game. For instance, the bonus game may be triggered or activated when the player receives an icon, or indicia in the case of a slot game, while the primary game is being played. Bonus games appeal to players because the probability of winning combinations after entry into the bonus game is, at least, greatly enhanced and, in most instances some sort of winning outcome is guaranteed.

A bonus game is typically a different type of game than the primary game. This provides more variety and excitement for a player and helps to keep the player at the gaming unit for a longer period of time. However, the bonus game may also be the same type of game as the primary game, except that the bonus game may have an increased potential for winning in comparison to the primary game.

In many cases, the bonus game is a singular event in that the play changes to the bonus game when a specific outcome occurs in the primary game. Thereafter, the bonus game is played to completion. When the bonus game is completed, the amount of the bonus payout is indicated. In these bonus games, the players are playing against the house and not playing against one another.

While the above-mentioned bonus games have been used in the gaming industry, improved gaming systems and methods are still needed to pique and maintain players' interests in gaming. Preferably, these improved gaming systems and methods would appeal to the players' competitive nature, introduced now with games of chance, and provide the potential for larger payoffs in comparison to the payoffs in the primary game and in other bonus games.

SUMMARY

In one aspect, the invention is directed to a bonus controller for managing a feature event bonus game in a gaming system, having a processor and a memory, wherein the bonus controller is programmed to assign an entry to a player associated with a first gaming apparatus from a plurality of entries defining a gaming pool for the feature event when the player obtains a qualifying win at one of a number of casino games. The bonus controller is also programmed to determine an outcome of the feature event bonus game and determine if at least one winner exists based on the outcome as well as identify the winner of the feature event.

In another aspect, the invention is directed to a gaming system for playing a feature event bonus game having a first gaming apparatus with a game display unit, a value input device and a controller operatively coupled to the game display unit and the value input device. The controller is programmed to cause the game display unit to generate a game display relating to one of the following games: poker, blackjack, slots, keno or bingo. The controller is also programmed to determine a value payout associated with an outcome of the game. The system also includes a second gaming apparatus operatively coupled to the first gaming apparatus, and a bonus controller operatively coupled to the first and second gaming apparatuses, wherein the bonus controller includes a processor and a memory operatively coupled to the processor of the bonus controller. The bonus controller is programmed to receive bonus data from the first and second gaming apparatuses, assign an entry to a player at the first gaming apparatus from a plurality of entries defining a gaming pool for the feature event bonus game when the player obtains a qualifying win at one of the games generated by the game display unit of the first gaming apparatus. The bonus controller is also programmed to determine an outcome of the feature event, the outcome determined by one of the entries of the plurality of entries, and to transmit data corresponding to the outcome of the feature event to at least one of the first and second gaming apparatuses and a remote display.

In yet another aspect, the invention is directed to a gaming system for playing a feature event bonus game that includes a first gaming apparatus having a display unit, a value input device and a controller operatively coupled to the display unit and the value input device, the controller having a processor and a memory operatively coupled to the processor of the first gaming apparatus. The controller is programmed to receive data representing a payline selection made by a player, cause a game display to be generated by the display unit, the game display having images of a plurality of slot machine symbols each of which is associated with a respective slot machine reel, and determine a value payout associated with an outcome of the slots game, the controller being programmed to determine the outcome of the slots game based on a first configuration of the slot machine symbols. The gaming system also includes a second gaming apparatus operatively coupled to the first gaming apparatus, the second gaming apparatus having a display unit, a value input device, and a controller operatively coupled to the display unit and the value input device, the controller having a processor and a memory operatively coupled to the processor of the second gaming apparatus. The controller being programmed to receive data representing a payline selection made by a second player, to cause a game display to be generated by the display unit, the game display having images of a plurality of slot machine symbols each of which is associated with a respective slot machine reel, and to determine a value payout associated with an outcome of the slots game, the controller being programmed to determine the outcome of the slots game based on a configuration of the slot machine symbols. The system also includes a bonus controller operatively coupled to the first and second gaming apparatuses, the bonus controller having a processor and a memory operatively coupled to the processor of bonus controller. The bonus controller is programmed to receive bonus data from the first and second gaming apparatuses, to assign an entry to the player at the first gaming apparatus from a plurality of entries defining a gaming pool for the feature event bonus game when the player obtains a qualifying win at the slots game, and to determine an outcome of the feature event. The bonus controller is also programmed to determine if at least one winner exists based on the outcome of the feature event, to identify the at least one winner of the feature event bonus game if the at least one winner exists, the at least one winner being identified based on the entry assigned to the player at the firs gaming apparatus, and to transmit data corresponding to the outcome of the feature event bonus game to at least one of the first and second gaming apparatuses and a remote display unit.

In another aspect, the invention is directed to a gaming system for playing a feature event bonus game, having a first gaming apparatus and a second gaming apparatus operatively coupled to the first gaming apparatus, the second gaming apparatus having a controller having a processor and a memory operatively coupled to the processor of the controller of the second gaming apparatus. The controller of the second gaming apparatus being programmed to receive bonus data from the first gaming apparatus, to assign an entry to a player at the first gaming apparatus from a plurality of entries defining a gaming pool for the feature event bonus game when the player qualifies for entry at one of the games generated by the game display unit of the first gaming apparatus, to determine an outcome of the feature event, the outcome determined by one of the entries of the plurality of entries, and to transmit data corresponding to the outcome of the feature event to at least one of the first gaming apparatus and a remote display.

In another aspect, the invention is directed to a gaming method that includes causing a game display of one of the following games to be generated on a display unit of a first gaming apparatus: poker, blackjack, slots, keno or bingo, causing a game display of one of the following games to be generated on a display unit of a second gaming apparatus: poker, blackjack, slots, keno or bingo, and determining an outcome of the game represented by the game display generated on the display unit of the first gaming apparatus. The method also includes transmitting bonus data from the first gaming apparatus to a bonus controller, determining if the outcome is a qualifying outcome for a feature event bonus game, qualifying a player at the first gaming apparatus for the feature event bonus game if the outcome is a qualifying outcome, and assigning an entry to the qualified player from a plurality of entries defining a gaming pool for the feature event bonus game. The method further includes determining a winner of the feature event bonus game, transmitting display data associated with the feature event bonus game from the bonus controller to a display unit, and determining a value payout associated with a feature event bonus award associated with the feature event bonus game.

In another aspect, the invention is directed to a method of providing a gaming pool for a feature event bonus game in a gaming network that includes receiving bonus data at a bonus controller, the bonus data corresponding to play of one of the following games: poker, blackjack, slots, keno or bingo, qualifying a player for the feature event bonus game if an outcome of the game is a qualifying outcome, assigning an entry to the qualified player from a plurality of entries defining the gaming pool for the feature event bonus game, and determining a monetary value of the gaming pool. The method also includes determining an outcome of the feature event, transmitting display data associated with the feature event bonus game from the bonus controller to a display unit, the display unit being operatively coupled to the bonus controller, and determining a value payout associated with the outcome of the feature event bonus game.

In yet another aspect, the invention is directed to a memory having a computer program stored therein, the computer program being capable of being used in connection with a bonus controller in a gaming system and including a memory portion physically configured in accordance with computer program instructions that would cause the bonus controller to receive bonus data corresponding to a game, the game selected from one of the following games: poker, blackjack, slots, keno or bingo. Also included is a memory portion physically configured in accordance with computer program instructions that would cause the bonus controller to assign an entry to a player from a plurality of entries defining a gaming pool for a feature event bonus game when the player obtains a qualifying win at the game, a memory portion physically configured in accordance with computer program instructions that would cause the bonus controller to determine an outcome of the feature event and a memory portion physically configured in accordance with computer program instructions that would cause the bonus controller to identify a winner of the feature event bonus game. Further included is a memory portion physically configured in accordance with computer program instructions that would cause the bonus controller to transmit display data associated with the feature event bonus game from the bonus controller to a display unit; and a memory portion physically configured in accordance with computer program instructions that would cause the bonus controller to determine a value payout associated with a feature event bonus award associated with the feature event bonus game.

Additional aspects of the invention are defined by the claims of this patent.

DETAILED DESCRIPTION OF VARIOUS EMBODIMENTS

Although the following text sets forth a detailed description of numerous different embodiments, it should be understood that the legal scope of the invention is defined by the words of the claims set forth at the end of this patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should also be understood that, unless a term is expressly defined in this patent using the sentence "As used herein, the term '______' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
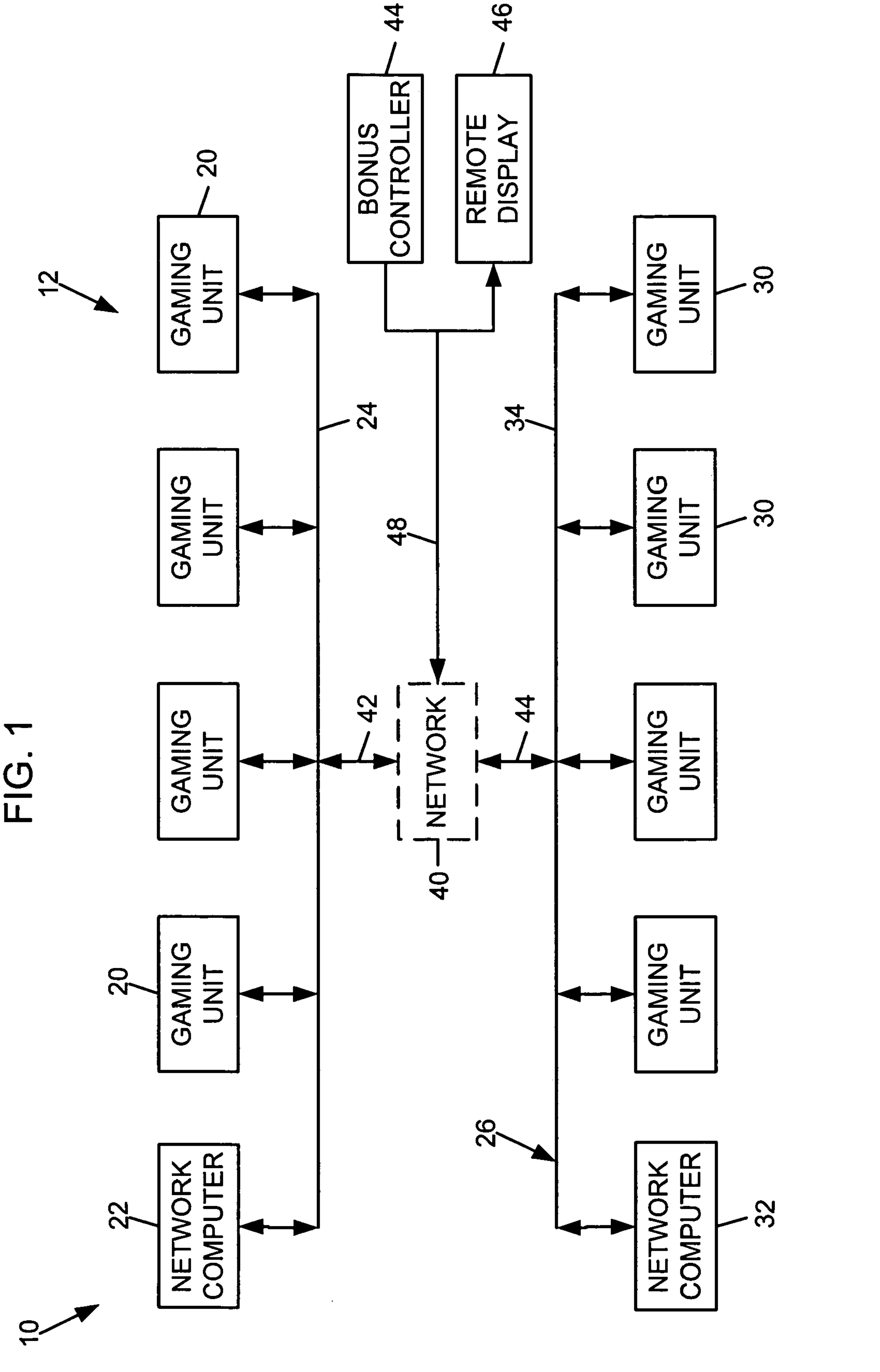
FIG. 1 is a block diagram of an embodiment of a gaming system in accordance with the invention.

FIG. 1 illustrates one possible embodiment of a casino gaming system 10 in accordance with the invention. Referring to FIG. 1, the casino gaming system 10 may include a first group or network 12 of casino gaming units 20 operatively coupled to a network computer 22 via a network data link or bus 24. The casino gaming system 10 may include a second group or network 26 of casino gaming units 30 operatively coupled to a network computer 32 via a network data link or bus 34. The first and second gaming networks 12, 26 may be operatively coupled to each other via a network 40, which may comprise, for example, the Internet, a wide area network (WAN), or a local area network (LAN) via a first network link 42 and a second network link 44.

The first network 12 of gaming units 20 may be provided in a first casino, and the second network 26 of gaming units 30 may be provided in a second casino located in a separate geographic location than the first casino. For example, the two casinos may be located in different areas of the same city, or they may be located in different states. The network 40 may include a plurality of network computers or server computers (not shown), each of which may be operatively interconnected. Where the network 40 comprises the Internet, data communication may take place over the communication links 42, 44 via an Internet communication protocol.

The network computer 22 may be a server computer and may be used to accumulate and analyze data relating to the operation of the gaming units 20. For example, the network computer 22 may continuously receive data from each of the gaming units 20 indicative of the dollar amount and number of wagers being made on each of the gaming units 20, data indicative of how much each of the gaming units 20 is paying out in winnings, data regarding the identity and gaming habits of players playing each of the gaming units 20, etc. The network computer 32 may be a server computer and may be used to perform the same or different functions in relation to the gaming units 30 as the network computer 22 described above.

Although each network 12, 26 is shown to include one network computer 22, 32 and four gaming units 20, 30, it should be understood that different numbers of computers and gaming units may be utilized. For example, the network 12 may include a plurality of network computers 22 and tens or hundreds of gaming units 20, all of which may be interconnected via the data link 24. The data link 24 may be provided as a dedicated hardwired link or a wireless link. Although the data link 24 is shown as a single data link 24, the data link 24 may comprise multiple data links.

A bonus controller 44 and a remote display 46 may also be coupled to the network 40 via a third network link 48. The bonus controller 44 may be used to receive and transmit data to the gaming units 20, the network computers 22, 32, and the remote display 46. The bonus controller may also be used to control the operation of a feature event bonus game for players at the gaming units 20.

Those of ordinary skill in the art will appreciate that the bonus controller 44 may be operatively coupled directly to the network computer 22, 32 or incorporated within the network computer 22, 32. Similarly, the bonus controller 44 may be operatively coupled directly to one of the gaming units 20 or incorporated within one of the gaming units 20. Those of ordinary skill in the art will appreciate that the functions of the bonus controller 44 may alternatively be performed by the network computer 22, 32 or one of the gaming units 20. For example, there could be a master-slave relationship where one of the gaming units 20 also serves as the bonus controller and the other gaming units may or may not participate in the bonus controlling functionality. As an alternative example, a peer-to-peer relationship could be utilized where each of the gaming units 20 performs equivalent bonus controller implementation with the necessary data communicated between the gaming units 20.

The remote display 46 may be either an electronic or mechanical device, or a combination of both. The remote display 46 may be used to display any number of aspects of a feature event bonus game to the players at the gaming units 20. It should also be noted that the remote display may be eliminated by utilizing the individual gaming units 20 to display characteristics and data corresponding to the feature event bonus game.

The remote display 46 may, for example, be configured as a relatively large liquid crystal display ("LCD") screen, or a plurality of such screens. The remote display may be relatively large in comparison to the display units 70 (described below) on the gaming units 20. The remote display 46 may be positioned in an area above the gaming units 20 or the gaming units 30 so that the remote display 46 is visible to all players at the gaming units 20 or the gaming units 30. The remote display 46 may comprise other types of display screens known in the art, including cathode-ray two (CRT) screens, plasma display screens, and/or screens based on light-emitting diode (LED) technology. The remote display 46 may be a display screen configured for multiple uses and concurrent display of other casino-sponsored information. For example, the remote display 46 may be used in association with a Sports Book venue of the casino during periods in which the remote display 46 is temporarily not used for the purpose of displaying aspects of the feature event bonus game. The remote display 46 may be positioned in the establishment to be visible to all players at the gaming machines 20 or the gaming machines 30.

Figure 2:
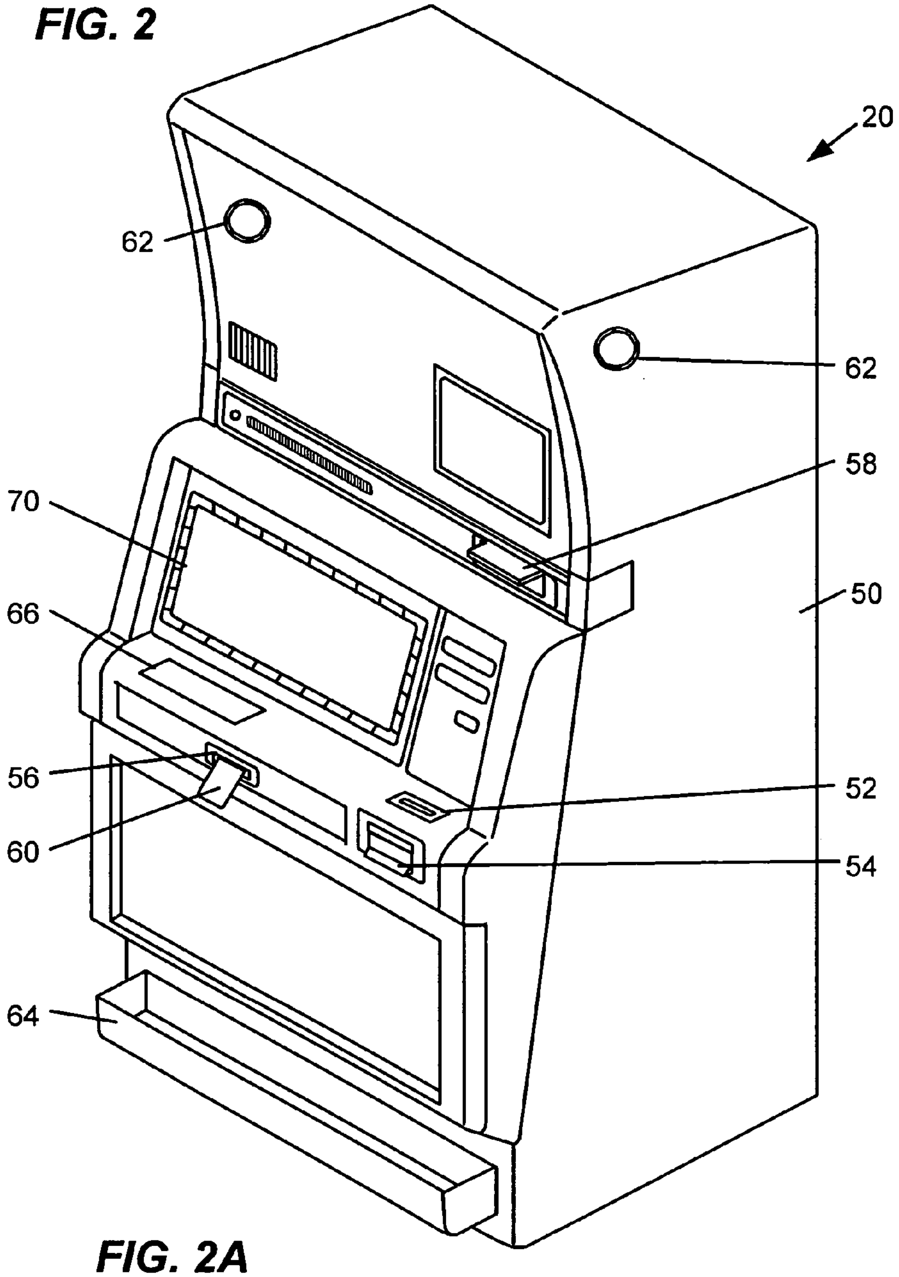
FIG. 2 is a perspective view of an embodiment of one of the gaming units shown schematically in FIG. 1.

FIG. 2 is a perspective view of one possible embodiment of one or more of the gaming units 20. Although the following description addresses the design of the gaming units 20, it should be understood that the gaming units 30 may have the same design as the gaming units 20 described below. It should be understood that the design of one or more of the gaming units 20 may be different than the design of other gaming units 20, and that the design of one or more of the gaming units 30 may be different than the design of other gaming units 30. Each gaming unit 20 may be any type of casino gaming unit and may have various different structures and methods of operation. For exemplary purposes, various designs of the gaming units 20 are described below, but it should be understood that numerous other designs may be utilized.

Referring to FIG. 2, the casino gaming unit 20 may include a housing or cabinet 50 and one or more input devices, which may include a coin slot or acceptor 52, a paper currency acceptor 54, a ticket reader/printer 56 and a card reader 58, which may be used to input value to the gaming unit 20. A value input device may include any device that can accept value from a customer. As used herein, the term "value" may encompass gaming tokens, coins, paper currency, ticket vouchers, credit or debit cards, smart cards, and any other object representative of value.

If provided on the gaming unit 20, the ticket reader/printer 56 may be used to read and/or print or otherwise encode ticket vouchers 60. The ticket vouchers 60 may be composed of paper or another printable or encodable material and may have one or more of the following informational items printed or encoded thereon: the casino name, the type of ticket voucher, a validation number, a bar code with control and/or security data, the date and time of issuance of the ticket voucher, redemption instructions and restrictions, a description of an award, and any other information that may be necessary or desirable. Different types of ticket vouchers 60 could be used, such as bonus ticket vouchers, cash-redemption ticket vouchers, casino chip ticket vouchers, extra game play ticket vouchers, merchandise ticket vouchers, restaurant ticket vouchers, show ticket vouchers, etc. The ticket vouchers 60 could be printed with an optically readable material such as ink, or data on the ticket vouchers 60 could be magnetically encoded. The ticket reader/printer 56 may be provided with the ability to both read and print ticket vouchers 60, or it may be provided with the ability to only read or only print or encode ticket vouchers 60. In the latter case, for example, some of the gaming units 20 may have ticket printers 56 that may be used to print ticket vouchers 60, which could then be used by a player in other gaming units 20 that have ticket readers 56.

If provided, the card reader 58 may include any type of card reading device, such as a magnetic card reader or an optical card reader, and may be used to read data from a card offered by a player, such as a credit card or a player tracking card. If provided for player tracking purposes, the card reader 58 may be used to read data from, and/or write data to, player tracking cards that are capable of storing data representing the identity of a player, the identity of a casino, the player's gaming habits, etc.

The gaming unit 20 may include one or more audio speakers 62, a coin payout tray 64, an input control panel 66, and a display unit 70. Where the gaming unit 20 is designed to facilitate play of a video casino game, such as video poker or video slots, the display unit 70 may be a color video display unit that displays images relating to the particular game or games. Where the gaming unit 20 is designed to facilitate play of a reel-type slot machine, the display unit 70 may comprise a plurality of mechanical reels that are rotatable, with each of the reels having a plurality of reel images disposed thereon. The audio speakers 62 may generate audio representing sounds such as the noise of spinning slot machine reels, a dealer's voice, music, announcements or any other audio related to a casino game. The input control panel 66 may be provided with a plurality of pushbuttons or touch-sensitive areas that may be pressed by a player to select games, make wagers, make gaming decisions, etc.

Figure 2A:
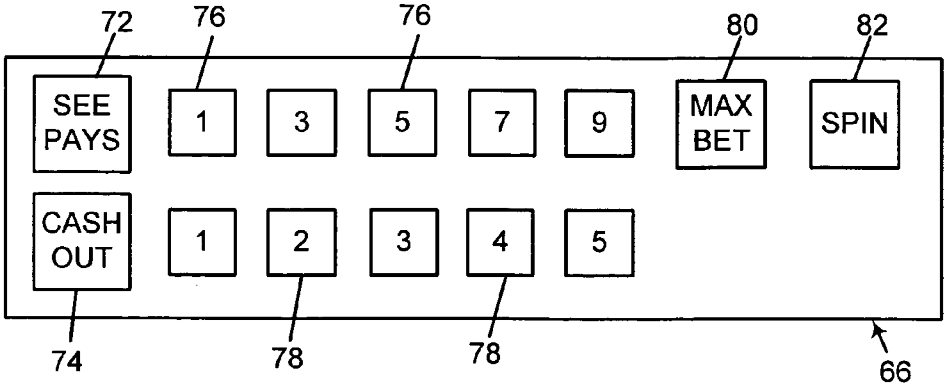
FIG. 2A illustrates an embodiment of a control panel for a gaming unit.

FIG. 2A illustrates one possible embodiment of the control panel 66, which may be used where the gaming unit 20 is a slot machine having a plurality of mechanical or "virtual" reels. Referring to FIG. 2A, if the display unit 70 is provided in the form of a video display unit, the control panel 66 may include a "See Pays" button 72 that, when activated, causes the display unit 70 to generate one or more display screens showing the odds or payout information for the game or games provided by the gaming unit 20. As used herein, the term "button" is intended to encompass any device that allows a player to make an input, such as an input device that must be depressed to make an input selection or a display area that a player may simply touch. The control panel 66 may include a "Cash Out" button 74 that may be activated when a player decides to terminate play on the gaming unit 20, in which case the gaming unit 20 may return value to the player, such as by returning a number of coins to the player via the payout tray 64.

If the gaming unit 20 provides a slots game having a plurality of reels and a plurality of paylines which define winning combinations of reel symbols, the control panel 66 may be provided with a plurality of selection buttons 76, each of which allows the player to select a different number of paylines prior to spinning the reels. For example, five buttons 76 may be provided, each of which may allow a player to select one, three, five, seven or nine paylines.

If the gaming unit 20 provides a slots game having a plurality of reels, the control panel 66 may be provided with a plurality of selection buttons 78 each of which allows a player to specify a wager amount for each payline selected. For example, if the smallest wager accepted by the gaming unit 20 is a quarter ($0.25), the gaming unit 20 may be provided with five selection buttons 78, each of which may allow a player to select one, two, three, four or five quarters to wager for each payline selected. In that case, if a player were to activate the "5" button 76 (meaning that five paylines were to be played on the next spin of the reels) and then activate the "3" button 78 (meaning that three coins per payline were to be wagered), the total wager would be $3.75 (assuming the minimum bet was $0.25).

The control panel 66 may include a "Max Bet" button 80 to allow a player to make the maximum wager allowable for a game. In the above example, where up to nine paylines were provided and up to five quarters could be wagered for each payline selected, the maximum wager would be 45 quarters, or $11.25. The control panel 66 may include a spin button 82 to allow the player to initiate spinning of the reels of a slots game after a wager has been made.

In FIG. 2A, a rectangle is shown around the buttons 72, 74, 76, 78, 80, 82. It should be understood that that rectangle simply designates, for ease of reference, an area in which the buttons 72, 74, 76, 78, 80, 82 may be located. Consequently, the term "control panel" should not be construed to imply that a panel or plate separate from the housing 50 of the gaming unit 20 is required, and the term "control panel" may encompass a plurality or grouping of player activatable buttons.

Although one possible control panel 66 is described above, it should be understood that different buttons could be utilized in the control panel 66, and that the particular buttons used may depend on the game or games that could be played on the gaming unit 20. If the display unit 70 is provided as a video display unit, the control panel 66 could be generated by the display unit 70. In that case, each of the buttons of the control panel 66 could be a colored area generated by the display unit 70, and some type of mechanism may be associated with the display unit 70 to detect when each of the buttons was touched, such as a touch-sensitive screen.

Gaming Unit Electronics

Figure 3:
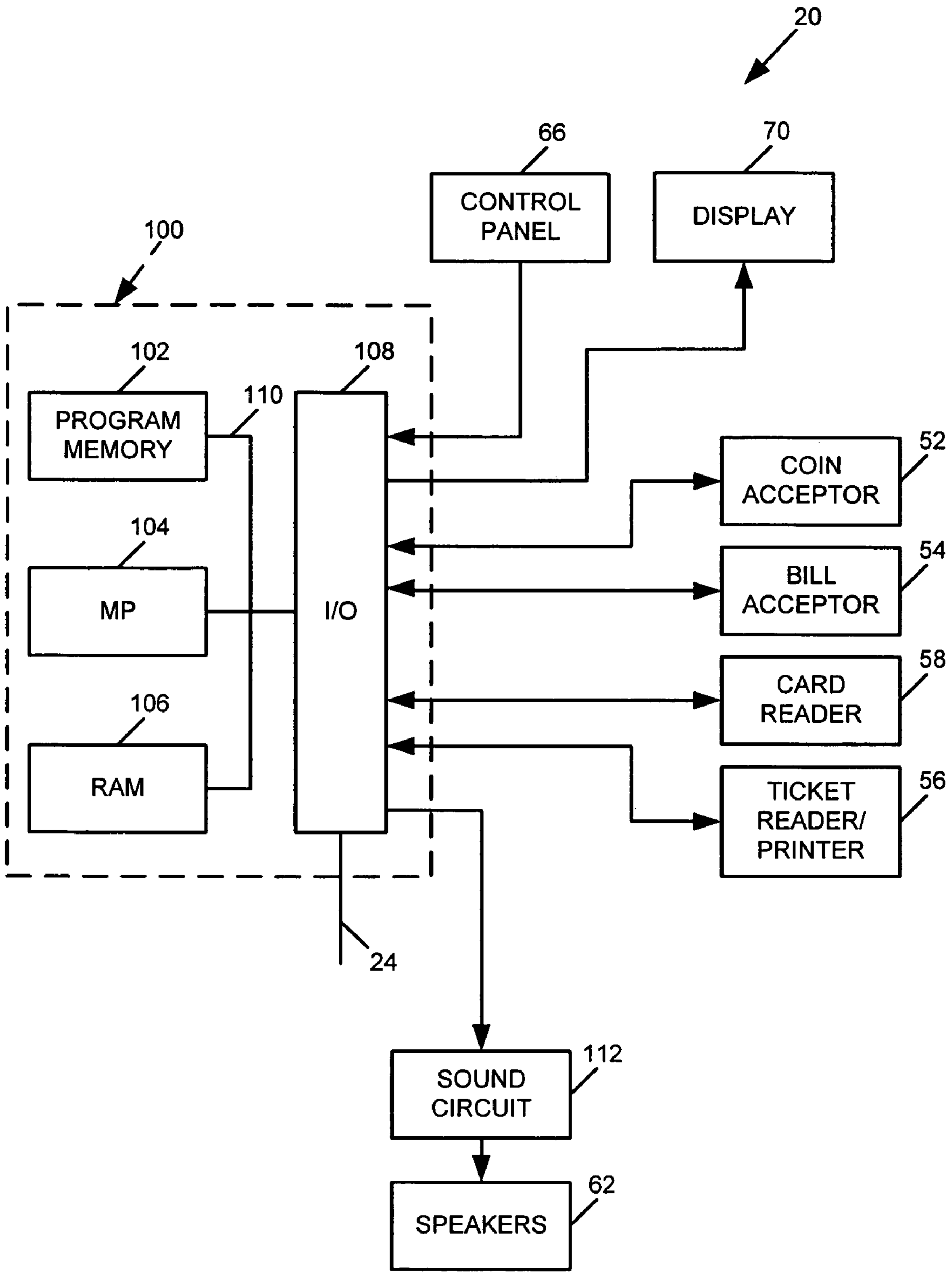
FIG. 3 is a block diagram of the electronic components of the gaming unit of FIG. 2.

FIG. 3 is a block diagram of a number of components that may be incorporated in the gaming unit 20. Referring to FIG. 3, the gaming unit 20 may include a controller 100 that may comprise a program memory 102, a microcontroller or microprocessor (MP) 104, a random-access memory (RAM) 106 and an input/output (I/O) circuit 108, all of which may be interconnected via an address/data bus 110. It should be appreciated that although only one microprocessor 104 is shown, the controller 100 may include multiple microprocessors 104. Similarly, the memory of the controller 100 may include multiple RAMs 106 and multiple program memories 102. Although the I/O circuit 108 is shown as a single block, it should be appreciated that the I/O circuit 108 may include a number of different types of I/O circuits. The RAM(s) 106 and program memories 102 may be implemented as semiconductor memories, magnetically readable memories, and/or optically readable memories, for example.

Although the program memory 102 is shown in FIG. 3 as a read-only memory (ROM) 102, the program memory of the controller 100 may be a read/write or alterable memory, such as a hard disk. In the event a hard disk is used as a program memory, the address/data bus 110 shown schematically in FIG. 3 may comprise multiple address/data buses, which may be of different types, and there may be an I/O circuit disposed between the address/data buses.

FIG. 3 illustrates that the control panel 66, the coin acceptor 52, the bill acceptor 54, the card reader 58 and the ticket reader/printer 56 may be operatively coupled to the I/O circuit 108, each of those components being so coupled by either a unidirectional or bidirectional, single-line or multiple-line data link, which may depend on the design of the component that is used. The speaker(s) 62 may be operatively coupled to a sound circuit 112, that may comprise a voice- and sound-synthesis circuit or that may comprise a driver circuit. The sound-generating circuit 112 may be coupled to the I/O circuit 108.

As shown in FIG. 3, the components 52, 54, 56, 58, 66, 70, 112 may be connected to the I/O circuit 108 via a respective direct line or conductor. Different connection schemes could be used. For example, one or more of the components shown in FIG. 3 may be connected to the I/O circuit 108 via a common bus or other data link that is shared by a number of components. Furthermore, some of the components may be directly connected to the microprocessor 104 without passing through the I/O circuit 108.

Figure 4:
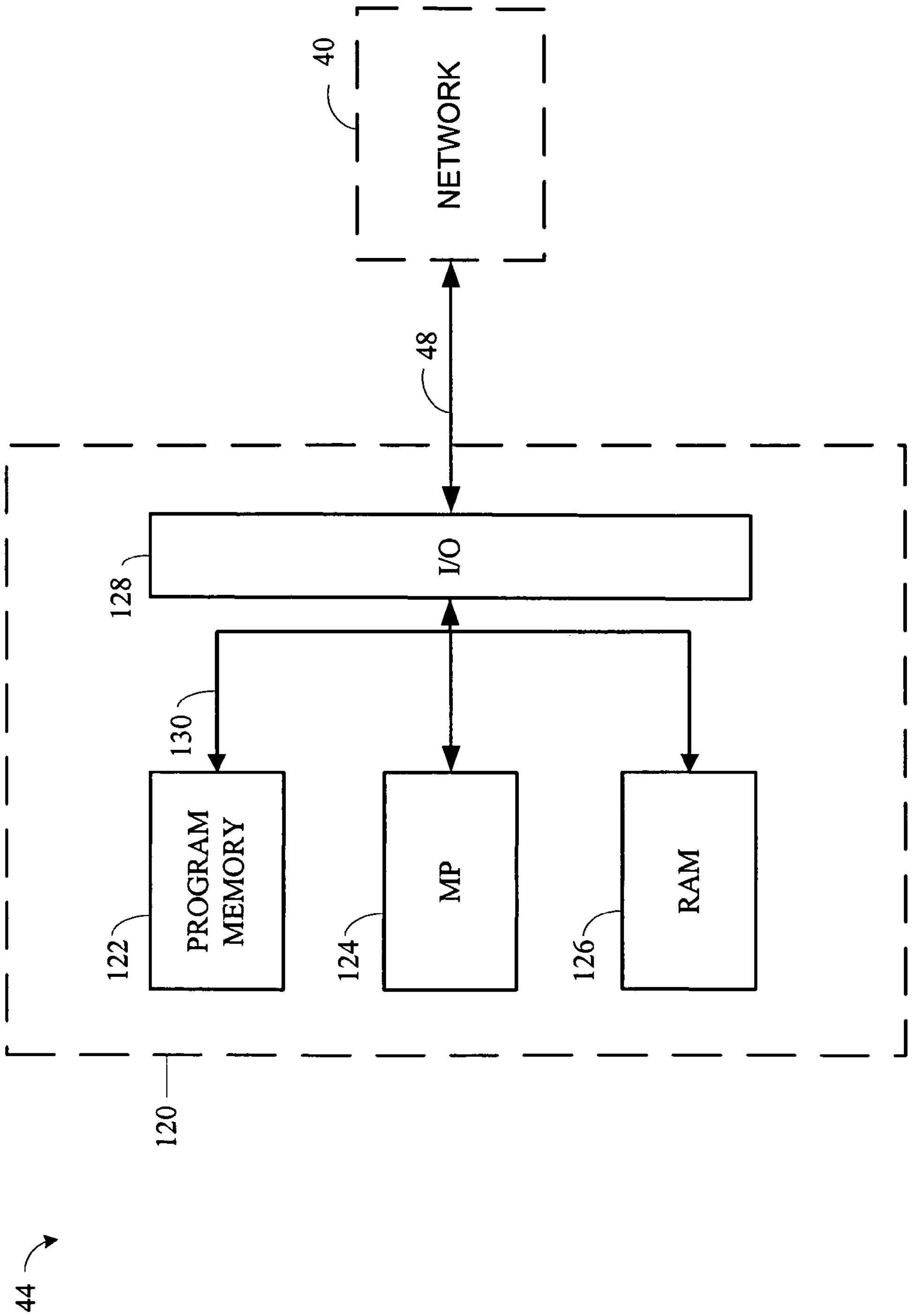
FIG. 4 is a block diagram of the electronic components of the bonus controller of FIG. 1.

FIG. 4 is a block diagram of a number of components that may be incorporated in the bonus controller 44. Referring to FIG. 4, the bonus controller 44 may include a controller 120 that may comprise a program memory 122, a microcontroller or microprocessor (MP) 124, a random-access memory (RAM) 126 and an input/output (I/O) circuit 128, all of which may be interconnected via an address/data bus 130. As with the controller 100, it should be appreciated that although only one microprocessor 124 is shown, the controller 120 may include multiple microprocessors 124. Similarly, the memory of the controller 120 may include multiple RAMs 126 and multiple program memories 122. Although the I/O circuit 128 is shown as a single block, it should be appreciated that the I/O circuit 128 may include a number of different types of I/O circuits. The RAM(s) 126 and program memories 122 may be implemented as semiconductor memories, magnetically readable memories, and/or optically readable memories, for example.

Although the program memory 122 is shown in FIG. 4 as a read-only memory (ROM) 122, the program memory of the controller 120 may be a read/write or alterable memory, such as a hard disk. In the event a hard disk is used as a program memory, the address/data bus 130 shown schematically in FIG. 4 may comprise multiple address/data buses, which may be of different types, and there may be an I/O circuit disposed between the address/data buses. Furthermore, the controller 120 is operatively coupled to the network 40 via the link 48.

Overall Operation of Gaming Unit

One manner in which one or more of the gaming units 20 (and one or more of the gaming units 30) may operate is described below in connection with a number of flowcharts which represent a number of portions or routines of one or more computer programs, which may be stored in one or more of the memories of the controller 100. The computer program(s) or portions thereof may be stored remotely, outside of the gaming unit 20, and may control the operation of the gaming unit 20 from a remote location. Such remote control may be facilitated with the use of a wireless connection, or by an Internet interface that connects the gaming unit 20 with a remote computer (such as one of the network computers 22, 32) having a memory in which the computer program portions are stored. The computer program portions may be written in any high level language such as C, C++, C#, Java or the like or any low-level assembly or machine language. By storing the computer program portions therein, various portions of the memories 102, 106 are physically and/or structurally configured in accordance with computer program instructions.

It should be noted that the present patent relates to gaming methods and systems where a feature event bonus game may be linked to play of primary games at the individual gaming units 20. The bonus game is a feature event in that a gaming pool is used in association with a feature event, such as a sporting event. The bonus game is described in detail with reference to FIGS. 7-10. However, before describing the feature event bonus game in detail, a basic overview of a player's gaming experience playing a primary game and then potentially the feature event bonus game will be described below with reference to FIGS. 5 and 6.

Figure 5:
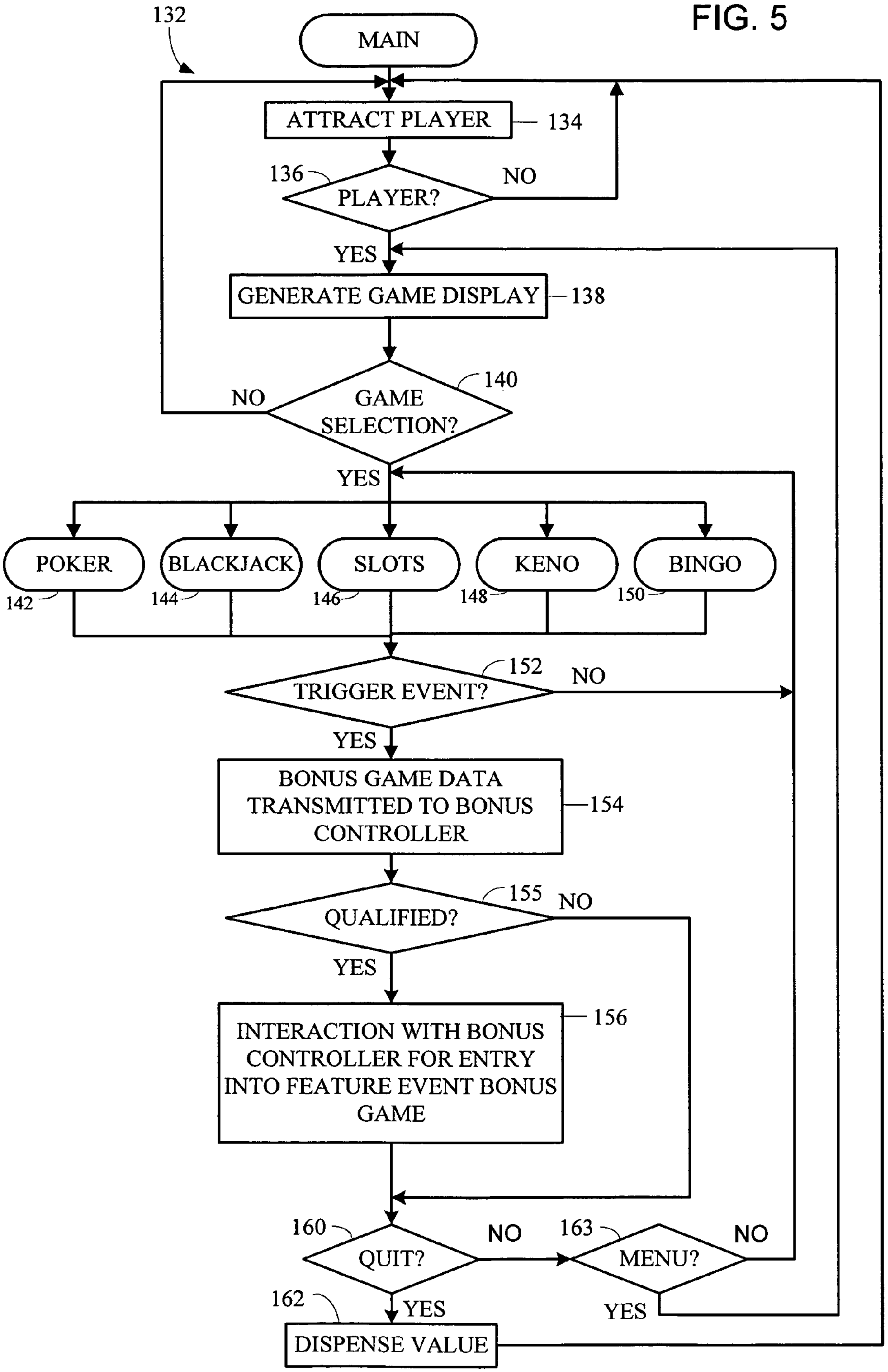
FIG. 5 is a flowchart of an embodiment of a main routine that may be performed during operation of one or more gaming units.

FIG. 5 is a flowchart of a main operating routine 132 that may be stored in the memory of the controller 100. Referring to FIG. 5, the main routine 132 may begin operation at block 134 during which an attraction sequence may be performed in an attempt to induce a potential player to play the gaming unit 20. The attraction sequence may be performed by displaying one or more video images on the display unit 70 (if provided as a video display unit) and/or causing one or more sound segments, such as voice or music, to be generated via the speakers 62. The attraction sequence may include a scrolling list of primary (i.e. first) games that may be played on the gaming unit 20 and/or video images of various games being played, such as video poker, video blackjack, video slots, video keno, video bingo, etc.

During performance of the attraction sequence, if a potential player makes any input to the gaming unit 20 as determined at block 136, the attraction sequence may be terminated and a game-selection display may be generated on the display unit 70 (if provided as a video display unit) at block 138 to allow the player to select a game available on the gaming unit 20. The gaming unit 20 may detect an input at block 136 in various ways. For example, the gaming unit 20 could detect if the player presses any button on the gaming unit 20; the gaming unit 20 could determine if the player deposited one or more coins into the gaming unit 20; the gaming unit 20 could determine if player deposited paper currency into the gaming unit; etc.

The game-selection display generated at block 138 may include, for example, a list of primary video games that may be played on the gaming unit 20 and/or a visual message to prompt the player to deposit value into the gaming unit 20. While the game-selection display is generated, the gaming unit 20 may wait for the player to make a game selection. Upon selection of one of the games by the player as determined at block 140, the controller 100 may cause one of a number of primary game routines to be performed to allow the selected game to be played. For example, the primary game routines could include a video poker routine 142, a video blackjack routine 144, a slots routine 146, a video keno routine 148, and a video bingo routine 150. At block 140, if no game selection is made within a given period of time, the operation may branch back to block 134.

After one of the routines 142, 144, 146, 148, 150 has been performed to allow the player to play one of the primary games, a game outcome may be determined for the game selected and played by the player by the gaming unit 20 as described below with reference to FIGS. 11-20. The routine 132 may then determine if the outcome was a trigger event at a block 152. If the outcome was not a trigger event, the routine may return to play of the selected game. If the outcome was a trigger event, bonus data corresponding to the game played by the player may then be transmitted to the bonus controller 44 at block 154. The bonus data may include, for example, the identity of the player, the amount wagered during play of the primary game, the duration of play at the primary game, the outcome of the primary game, the total amount wagered at the primary game, etc.

After the bonus data is transmitted to the bonus controller 44, the bonus controller 44 may determine if the primary game outcome was a qualified win (block 155) and eligible to enter and play the feature event bonus game at block 156. As mentioned above, embodiments of the feature event bonus game are discussed below with reference to FIGS. 7-10. If the player entered the feature event bonus game, data corresponding to the play and outcome of the feature event bonus game may be transmitted to the gaming unit 20 and possibly the remote display 46.

Thereafter, block 160 may be utilized to determine whether the player wishes to terminate play on the gaming unit 20 or to return to play of the same game or select another game. If the player wishes to stop playing the gaming unit 20, which wish may be expressed, for example, by selecting a "Cash Out" button, the controller 100 may dispense value to the player at block 162 based on the outcome of the game(s) played by the player. The operation may then return to block 134. If the player did not wish to quit as determined at block 160, the routine may determine (block 163) whether the player wishes to select another primary game and return to block 138 where the game-selection display may again be generated or to play the same game previously played by returning to the specifice game routine for the previously played game.

It should be noted that although five gaming routines are shown in FIG. 5, a different number of routines could be included to allow play of a different number of primary games. The gaming unit 20 may also be programmed to allow play of different games.

Figure 6:
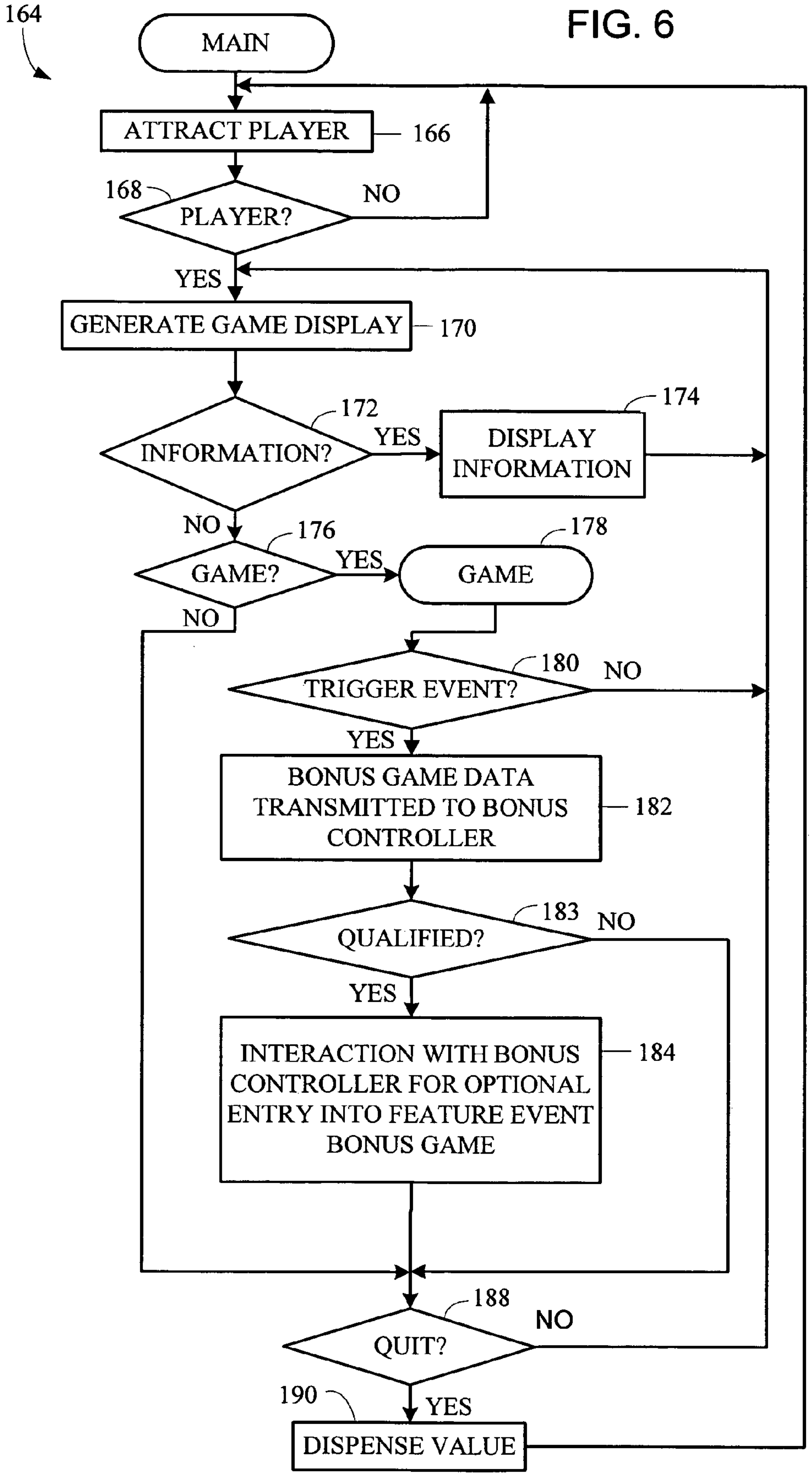
FIG. 6 is a flowchart of an alternative embodiment of a main routine that may be performed during operation of one or more of the gaming units.

FIG. 6 is a flowchart of an alternative main operating routine 164 that may be stored in the memory of the controller 100. The main routine 164 may be utilized for gaming units 20 that are designed to allow play of only a single, primary game or single type of game. Referring to FIG. 6, the main routine 164 may begin operation at block 166 during which an attraction sequence may be performed in an attempt to induce a potential player in a casino to play the gaming unit 20. The attraction sequence may be performed by displaying one or more video images on the display unit 70 (if provided as a video display unit) and/or causing one or more sound segments, such as voice or music, to be generated via the speakers 62.

During performance of the attraction sequence, if a potential player makes any input to the gaming unit 20 as determined at block 168, the attraction sequence may be terminated and a game display may be generated on the display unit 70 (if provided as a video display unit) at block 170. The game display generated at block 170 may include, for example, an image of the primary, casino game that may be played on the gaming unit 20 and/or a visual message to prompt the player to deposit value into the gaming unit 20. At block 172, the gaming unit 20 may determine if the player requested information concerning the game, in which case the requested information may be displayed at block 174. Block 176 may be used to determine if the player requested initiation of a primary game, in which case a game routine 178 may be performed. The game routine 178 could be any one of the game routines disclosed herein, such as one of the five game routines 142, 144, 146, 148, 150, or another game routine.

After the routine 178 has been performed to allow the player to play the game, a game outcome may be determined for the game played by the player and it may be determined whether the outcome was a trigger event at a block 180. Bonus data corresponding the game played by the player may then be transmitted to the bonus controller 44 at block 182. The bonus data may include, for example, data similar to that described in relation to the flowchart of FIG. 5.

After the bonus data is transmitted to the bonus controller 44, it may be determined whether the player qualified to enter and play the feature event bonus game at block 183. If the player entered the feature event bonus game (block 184), data corresponding to the play and outcome of the feature event bonus game may be transmitted to the gaming unit 20 and/or possibly the remote display 46.

Thereafter, block 188 may be utilized to determine whether the player wishes to terminate play on the gaming unit 20. If the player wishes to stop playing the gaming unit 20, which wish may be expressed, for example, by selecting a "Cash Out" button, the controller 100 may dispense value to the player at block 190 based on the outcome of the game(s) played by the player. The operation may then return to block 166. If the player did not wish to quit as determined at block 188, the operation may return to block 170.

Feature Event Bonus Games

A feature event for which players become qualified to wager upon may be any of a number of contests or contest types. One example of a feature event includes a live contest wherein boxing, basketball, baseball, football, hockey, figure skating, racing, or nearly any other sporting event may be utilized as a feature event upon which a gaming pool may be created. Optionally, in order to entice play of non-sports enthusiasts, a feature event may be a non-sports related contest, such as, for example, an entertainment award show, a beauty pageant, a "reality television" show or the like, wherein a gaming pool may be created where players wager on the winner of a particular award contest, beauty pageant or so-called reality television show. For example, a player may be permitted to participate in an Academy Award gaming pool wherein a player selects or is assigned a contestant for each category of awards (i.e., best picture, best actor, etc.).

It is noted that, as used herein, the terms "contestant", "team" and "participant" each refer to an entity competing in some manner in the feature event and is the entity upon which a wager may be placed. A team is an example of a contestant in a football game. In contrast, the term "player" refers to an individual who interacts with a gaming apparatus or device of some type, qualifies by winning or buying a wager or entry in an upcoming feature event, and places the wager on a contestant or participant.

The manner of wagering on the feature event once qualified may also be varied, depending on the wagering parameters set by the event administrator. For example, each player winning an entry to wager may be permitted to place the same wager on any desired participant or contestant. While it is feasible for multiple players to have identical entries and share the monetary award, a more likely approach provides a unique entry for each player. When players each have unique entries, a higher probability exists that all available entries may sell out before the feature event. Multiple won entries or wagers may or may not be placed on the same participant or contestant, or distributed among multiple participants or contestants. Combination wagers, such as the place, show, exacta and trifecta wagers may or may not be permitted.

During feature event wagering, the player's event credits may be displayed on an event credit meter at his or her gaming unit 20. At the end of a given feature event, the winner or winners are identified by the bonus controller 44. Thereafter, the winner or winners may redeem their award(s). The winner (s) may do this by inserting their printed ticket, smart card, player tracking card, or other Id into a gamining unit 20 or kiosk or other redemption location. The winnings may also be posted to the event credit meter at each winner's gaming unit 20 or dispensed as cash or check. The check may be sent directly to the winner(s) home address. Alternatively, the winnings may be dispensed directly to the winner(s) bank account.

Figure 7:
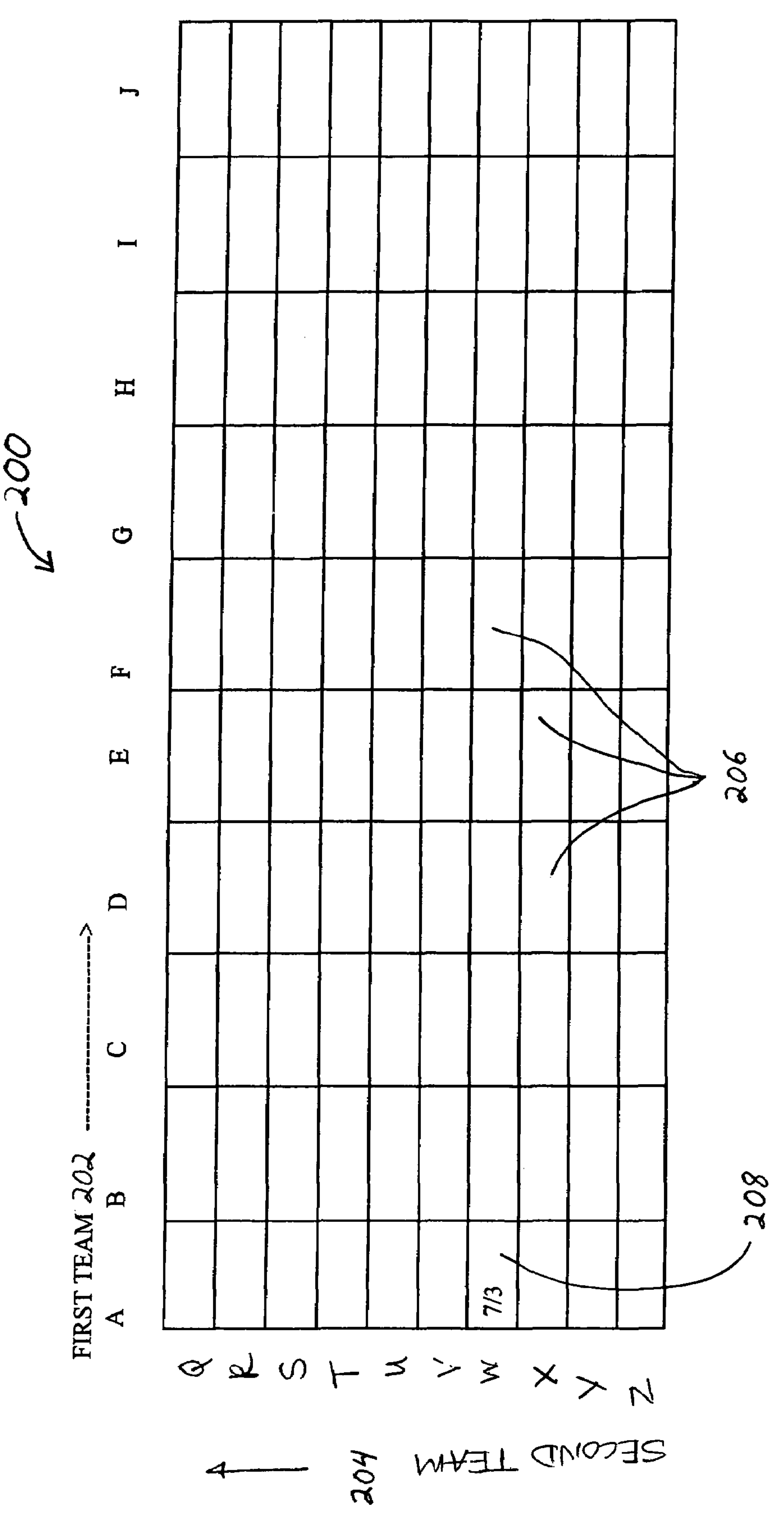
FIG. 7 is an illustration of an embodiment of a gaming pool matrix.

FIG. 7 depicts an embodiment of a conventional variation of a gaming pool having a 10×10 matrix 200 wherein the horizontal axis is associated with, for example, a first team 202 or contestant and the vertical axis with a second opposing team 204 or contestant. Each cell 206 in the matrix corresponds to an entry in the gaming pool. After all of the cells have been assigned to players, the digits 0 through 9 may be drawn at random for each axis. The digits may represent the lowest digit of the score for the corresponding team. For example, if the first team 202 had a score of "7" and the second opposing team 204 had a score of "13" at a predetermined point during the feature event, the player having an entry cell corresponding to "7-3" (cell 208) would be the winner.

It will be understood that numerous gaming pools may be established for a single feature event in order to encourage continued play of the primary game. For example, prior to the start of the feature event, players may win entry to a first gaming pool through play of a primary game. The first gaming pool, for example, may be directed to the status of the game at the end of a first quarter of play. During the first quarter of the game, players may be permitted to win entries into a second gaming pool directed, for example, to the status of the game at the end of the second quarter. When multiple pools are formed for a single feature event, it is contemplated that the player will be randomly assigned a feature event wager.

In some embodiments, the player's particular entry may be selected automatically, either at random or in a prescribed sequence. The game outcome of the primary game, e.g., what symbol pattern is hit, may be used to determine the wager. Each gaming units 20, 30 in a bank or other network of gaming units may be automatically assigned a contestant in the feature event such that the assigned contestant is wagered upon each time a player qualifies for the feature event on that particular unit. The player may choose the contestant, or the contestants may be assigned to each gaming unit 20, 30 randomly or in the order of qualification for the feature event, so that the first unit qualified is assigned (in the context of a car race feature event) the car with the "pole" position.

In alternative embodiments, the player may be allowed to select which team or contestant to wager upon. Generally, even when the player is allowed to make an entry selection, he does not have prior knowledge of the event outcome associated with the entry. For example, if the gaming pool is the 10×10 matrix described herein with reference to FIG. 7, the player may be allowed to select the particular feature event to wager upon and the matrix may be displayed showing which cells have been issued but not showing the particular digits assigned to each cell. The player may be permitted to select which blank cell he wants and may receive a coordinate identifier, such as a letter (e.g. A to J) for the column and another letter (e.g. Q to Z) for the row, for the particular cell. After the gaming pool is 'sold out' or, at least at some time after the gaming pool is closed and before the feature event, the system may randomize (or pseudo-randomize) the digits (0 to 9) for the rows and for the columns, assigning each digit to a corresponding letter. After the close of the gaming pool, digit information may be displayed so the player may view what actual scores his entry represents.

If the entries are automatically issued, the player's entry scores may be shown immediately on an entry ticket because the player would not be able to determine which entries have been issued or which entries remain to be issued. Such information could bias the game and the player's decision whether to continue to attempt to win additional entries into the gaming pool. In a blind gaming pool, the player may be induced to continue play of the primary game, thus generating more revenue for the game owner, in an attempt to win additional entries into the gaming pool for the feature event bonus game.

Figure 8:
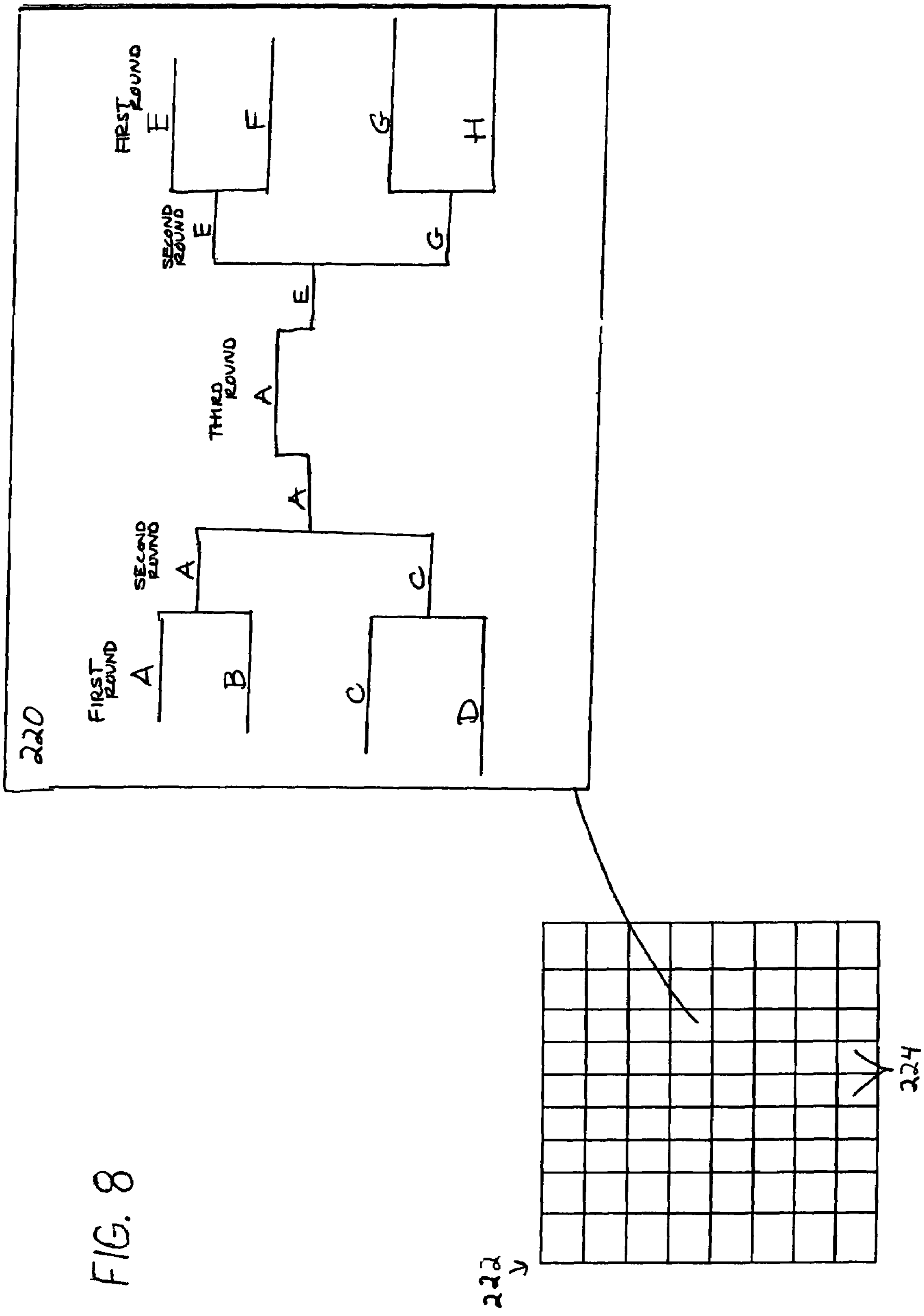
FIG. 8 is a flowchart of an embodiment of a main routine that may be performed during operation of the bonus controller.

Another popular gaming pool is a playoff or elimination tournament. In a single elimination tournament, pairs of teams are pitted against each other with the loser dropping out of the tournament and the winner progressing to the next round until only a single team remains. A feature event playoff gaming pool may be implemented in several ways. FIG. 8 depicts a completed single elimination tournament bracket 220 starting with eight teams or players (A-H) wherein 128 possible outcomes exist. Thus, the gaming pool may consist of a tournament matrix 222 similar to the matrix described above and with respect to FIG. 7 such that each cell 224 is associated with a unique completed tournament bracket 220 as shown in FIG. 8. In this embodiment, 128 unique tournament brackets are available as an entry. In other words, each qualified player may select, or be assigned, the winner of each of the playoff games in each of the three rounds of tournament play. The unique combination of winners of each of the three rounds may be sold or given to players with qualified wins at a primary game as a single entry for a total of 128 entries.

Alternatively, players may be allowed to create "fantasy teams". As known, a fantasy team includes individual contestants (e.g., football players) from various teams. In a fantasy team situation, each time a player wins entry into the feature event bonus game he may select, or be assigned, a particular contestant for his team. For example, if the feature event is a football game, the first time a player qualifies for an entry, he may select or be assigned a quarterback and during the second winning entry, the player may select or be assigned a running back or other contestant for his fantasy team. In some embodiments, after winning an entry, a player may be able to chose a contestant to be 'traded out' and replaced with a new player. Thus, the player at the gaming unit may continue to play to try to improve his fantasy team. A player's fantasy team may exist for only a single round of games, for example one week in many sports, or may last throughout a season. The winner of a fantasy team feature event may be determined as known in fantasy leagues.

In another embodiment, the feature event may be a large tournament having 64 teams (e.g. NCAA basketball tournament). There are over $9\times10^{18}$ possible outcomes of a 64 team single elimination tournament rendering sale of all unique winning outcomes unlikely. However, a number of possible tournament structures exist.

A player may win entry into the entire large tournament after achieving a single qualified win at a primary game. Based on the perceived popularity of the large tournament, the event sponsor may require a player to win several primary game wins before being qualified to participate in the large tournament pool. Optionally, a player may need to earn entry into each round of the tournament. The winner of the tournament may be determined at the end of each round such that the player who selects all of the winning teams after each round of tournament play earns a monetary award. Alternatively, the winner may be determined at the completion of the large tournament by identifying the player having the highest number of points. Each game in the tournament may be assigned the same number of points, or the games may be assigned variable points based on the seeding of the teams or round of the large tournament.

After the feature event, the winner may be determined through a variety of methods. A feature event bonus award typically is the total value of the entries, thus satisfying a 100% minimum payout required in some jurisdictions. The gaming pool may pay out 100%, or more, of the value of the entries because the profitability may come from the play of the primary game. Alternatively, the feature event bonus game sponsor may keep a portion of the value of the pool.

The awards provided for a winning "wager" in the feature event may be structured in numerous ways. For example, awards may be structured as a plurality of fixed prizes corresponding to a unit entry. There may also be a token prize awarded to every entrant so that every entrant wins something. In some gaming pools, the winner may be the player that exactly predicts the feature event outcome. In this embodiment, there is a chance that if not all of the possible entries are sold, no player will hold the winning entry. If after the pool closes, additional unassigned entries to the gaming pool still remain, the house (or system owner) may take all of the unsold entries. The award to the winner may be based on the maximum amount, realizing that the winner may be the house.

For example, if 10 entries are available and each entry has an intrinsic value of $5, the award pool may be $50 regardless of whether all entries were 'sold' to players. Alternatively, the award may only be the value of the entries sold to players and if the winning entry is not sold, all entries are refunded the entry value. In yet another embodiment, if the winning entry is not sold, the winner may be the player with the highest number of points in the gaming pool and the awards are amounts based upon the number of entries sold. In some embodiments less than 100% might be awarded, possibly with the balance going to charity. In other embodiments, the payout may be greater than 100%, possibly subsidized by the gaming establishment to entice additional play of the primary game. Another alternative for structuring the awards might include implementation of a progressive jackpot. If the winning entry was not sold, a progressive jackpot would retain the awards and add them to the finding of another feature event exhibited later in time.

As yet another variation, a winner-take-all pool, funded by a percentage of the feature event credits or points wagered may be provided. If so, the player or players placing a successful wager in the event will be awarded the winner-take-all pool. For example, in the eight-team playoff tournament discussed herein, there are 128 possible winning entries. If the entries have an intrinsic value of $5, the gaming pool may award $640 to the player with the exact correct outcome. Alternatively, the awards may be staggered to reward several players. For example, the player holding the winning outcome may receive $400, the player that correctly predicts the winners of the first two rounds may receive $120 and $20 may be awarded to each of six players that match the first round but not the second round (for a total of $640).

In the event of multiple winners, the feature event bonus award may be structured such that it is split between the multiple winners, or a tiebreaker may be performed through conduct of an additional feature event. Other means of breaking such a tie may be utilized including assessing criteria associated with the players' wagering on the primary gaming units such as which player was first in time to qualify for the feature event.

It is contemplated that in some embodiments, the feature event will last between several hours and several weeks. Thus, there is a possibility that the winning player may not be in the gaming establishment at the time he is declared the winner. Redemption of winning entries may be structured in several ways. A player may be permitted to redeem a winning entry directly on the gaming unit by inserting a wager ticket into the currency acceptor 54 or the ticket reader 56 on the gaming unit 20. Alternatively, the winning tickets might be redeemed on a separate kiosk or through an agent. The player may be required to have an attendant validate the ticket on the network computer before paying the player the award amount. The feature event bonus game sponsor may require a winning player to be present in the gaming establishment at the time the winner is announced or be forced to forfeit the prize. Alternatively, each player participating in a gaming pool may be required to register and provide information such as an address where winnings may be sent. In another embodiment, all players participating in a gaming pool may be required to register in a player tracking program which tracks a player's qualification and wager in gaming pools and allows a player to remotely redeem winning wagers.

Depending upon the implementation, the scope of gaming units over which a given gaming pool is available can vary. In some systems, the scope might be limited to individual gaming units. If gaming units are linked via a network, the scope might be limited to a given location of a gaming establishment. Alternatively, the scope might still be system wide, such that multiple gaming establishments may participate in a feature event bonus game.

Further, the concept of extending the opportunity to qualify for the feature event bonus game to additional and remote gaming devices or machines is not limited to banks, or groups of units, located at gaming establishment properties. If gaming units are linked via the Internet, the same pools might be offered at all of the gaming units in a system. Such networking may also include the use of personal computers as a primary gaming unit. As is known in the art, such personal computers may download software for play of the primary game. Upon qualification, which is contemplated to occur in a manner similar to qualification on a primary game located on a gaming establishment property, the player may be presented with an opportunity to wager on a specified feature event bonus game. It is contemplated that the software downloaded to the computer terminal may include a schedule of feature events in which the player may participate. Alternatively, a schedule of feature events may be posted on an Internet site associated with the gaming establishment or sponsor of the feature event bonus game. According to the determined feature event schedule, the player may then witness the event through his/her own personal computer terminal via the Internet, such as through streaming audio or video.

Operation of Gaming Pool for Feature Event Bonus Game

One manner in which the bonus controller 44 may operate is described below in connection with a number of flowcharts which represent a number of portions or routines of one or more computer programs, which may be stored in one or more of the memories of the controller 120. The computer program(s) or portions thereof may be stored remotely, outside of the bonus controller 44, and may control the operation of the bonus controller 44 from a remote location. Such remote control may be facilitated with the use of a wireless connection, or by an Internet interface that connects the bonus controller 44 with a remote computer (such as one of the network computers 22, 32) having a memory in which the computer program portions are stored. The computer program portions may be written in any high level language such as C, C++, C#, Java or the like or any low-level assembly or machine language. By storing the computer program portions therein, various portions of the memories 122, 126 are physically and/or structurally configured in accordance with computer program instructions.

Figure 9:
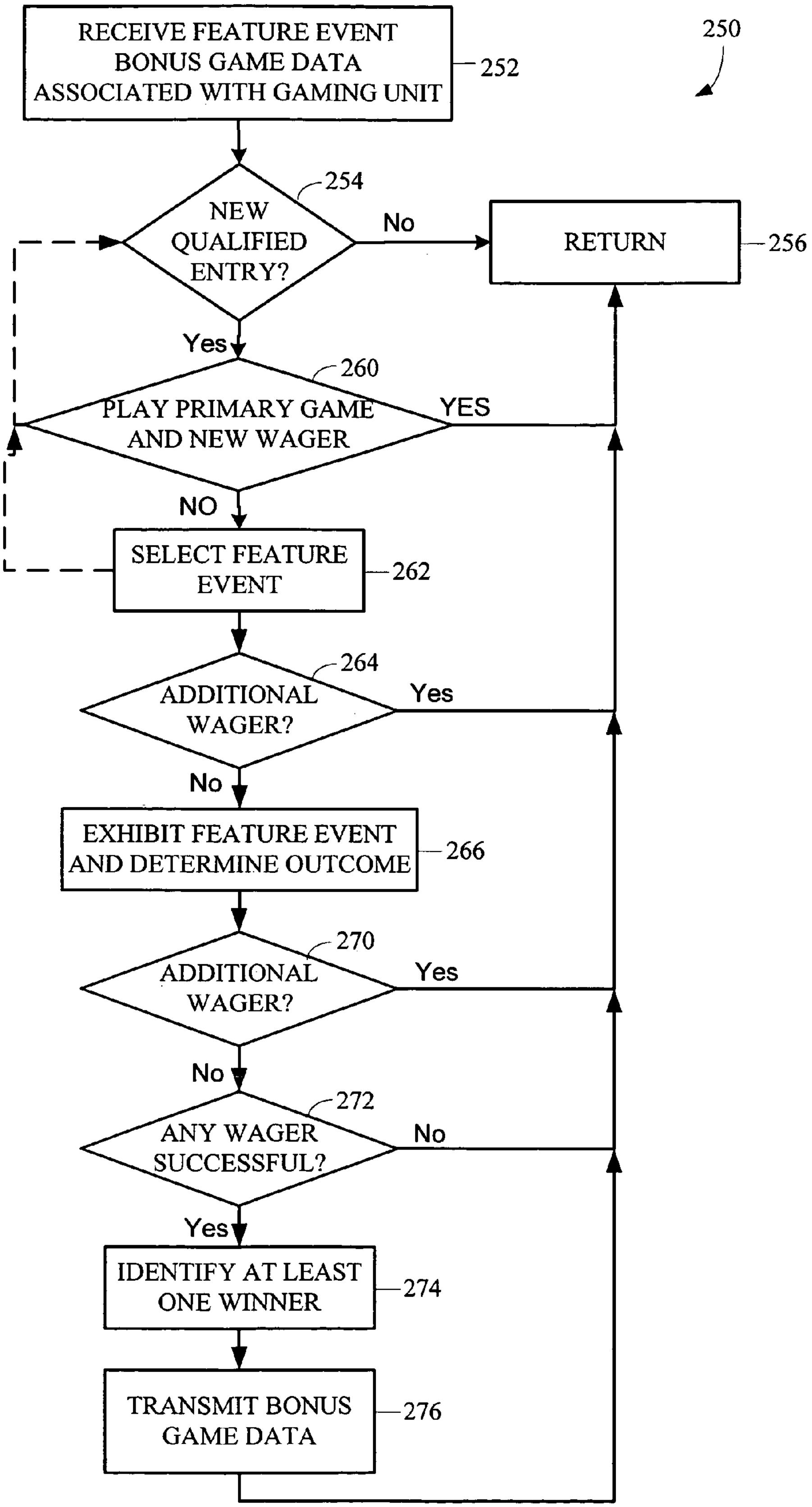
FIG. 9 is an illustration of an embodiment of a visual display of a tournament bracket that may be displayed during performance of feature event bonus game.

FIG. 9 is a flowchart of a main operating routine 250 that may be stored in the memory of the controller 120. Referring to FIG. 9, the main routine 250 may begin operation at block 252 during which the bonus controller obtains bonus data associated with the play of a primary game at one of the gaming units 20. Block 252 corresponds to the blocks 154 and 182 from FIGS. 5 and 6, respectively. After receiving the bonus data from, for example, the gaming unit 20, the bonus controller 44 may analyze the data and determine if the player qualifies to be entered into the competitive bonus game (block 254).

The player of the primary game may qualify for entry into the feature event bonus game when, for example, at least one specific outcome occurs during play of the primary game or by meeting other selected criteria associated with play of the primary game. At least one specific outcome may include the random display of a special symbol or element, referred to as an "event symbol." In a slot machine game, for example, the event symbol may be located on one or more of the rotatable reels of the slot machine. The player may qualify for the feature event bonus game when a specific number of event symbols appear anywhere on the display unit 70 of the gaming unit 20. The player may receive an entry into the feature event bonus game if a specific number of event symbols are present on the payline. In a card game, for example, the event symbol may be a bonus card and the player may qualify for the feature event bonus game by having the bonus card in his or her final hand. In addition, a stronger bonus-triggering outcome in a primary game may lead to additional or enhanced bonus game entries. The player may also be qualified for entry into the feature event bonus game based on a random event that occurs during play of the primary game or on an award from a second screen bonus feature of a primary game.

The player's participation in the feature event bonus game may also be related to the amount of his or her wager in the primary game. The player may be required to obtain a predetermined number of bonus credits before qualifying to play in a feature event bonus game. For example, the player may need five bonus credits to play the feature event bonus game. The player may receive one bonus credit by wagering one credit in a round of the primary game in which a qualifying, specific outcome occurs. The at least one specific outcome would then need to occur four more times, with the player wagering one credit each time, for the player to obtain the five bonus credits. However, the player may more quickly obtain the five bonus credits by wagering an increased number of credits in the primary game. For example, if the player wagered five credits in the primary game and the at least one specific outcome occurred, the player would receive five bonus credits and would immediately qualify for entry into the feature event bonus game. Another example of qualifying for the feature event bonus game may include obtaining a plurality of specific outcomes of playing the primary game. Other examples may include playing the primary game for a predetermined number of times or for a predetermined duration of time. Yet another example of qualifying an entry may include playing the primary game for a predetermined plurality of times and wagering a predetermined sum of money over the multiple plays.

In other examples, for instance in Jacks or Better video draw poker, games are 25 cents per credit with a maximum wager of 8 credits. The predetermined activity and qualifying event may require a minimum wager of 4 credits such that if a player has wagered at least 4 credits and gets a Full House, he may be provided the option of reducing his award by 20 credits ($5 value) and receiving an entry in a feature event. Similarly, if the player wagered 6 credits and a Full House normally pays 9 times the wager, he may have the option of either an award of 54 credits or an award of 34 credits plus a feature event entry. If it is determined at the block 254 that a player has not obtained a qualified entry, he may be permitted to continue play of the primary game (block 256).

If, however, it is determined at the block 254 that the entry is qualified for the feature event bonus game, the bonus controller 44 may query a player to determine whether the player wishes to "wager" his unit entry or feature event wagering points on an upcoming feature event or defer the wagering opportunity until a later feature event and continue playing the primary game (block 260). If it is determined at the block 260 that the player does not want to select a feature event, the logic returns to the placement of a wager in a primary game (block 256) wherein a player may again qualify for a feature event bonus game and possibly enhance his participation opportunity as has been described herein. If a player defers entry, a ticket (either electronic or paper) may be provided noting his entry qualification. A player's decision to defer may be made for the purpose of attempting to qualify multiple times for a later event and thus enhance the player's wagering opportunity. Those players who ultimately enhance their wagering opportunities through continued play of the primary gaming unit may be allowed to wager a greater "sum" on a contestant or to wager on more than one contestant, or may be allowed to place "exacta" and "trifecta" type wagers if the event includes an appropriate type of contest. A cap, or limit may be placed on how many wagers may be placed by a qualified player in any particular event.

Alternatively and optionally, if a player defers their feature event wagering opportunity, they may be permitted to wait until another feature event is available without subsequent play of the primary game being required. Thus, if a qualified player's schedule will not allow for participation in the upcoming feature event he or she may defer until a later time. Such deferral may be accomplished by giving an event token, printing an event qualification ticket or by indicating on a player's smart card the status of qualification.

A player may then be permitted to select from a variety of ongoing feature events once a player wins entry into the feature event bonus game (block 262). However, if a player is not interested in any of the feature events or if no feature events are available, logic may return the player to the primary game at block 256. Alternatively and optionally, a player may wait until another feature event is available without subsequent play of the primary game.

The selected gaming pool may be a sports pool, similar to the pool described herein and depicted in FIG. 7, having one hundred possible entries representing each combination of the low order digit of the scores of two teams for the feature event. In this embodiment, it is contemplated that the feature event is a single sporting event, for example, a basketball game. Upon deciding to place a wager, the system may select an available entry, remove that entry from the available entries and print (or electronically record) the information on a ticket for the player. Alternatively, the player may be permitted to select a "blank cell" entry. The ticket may also include a bar code identifying the particular gaming pool and the entry for later validation. For example, if the entry ticket shows "7 to 3", the player wins if the low digit of a first team's score is 7 (e.g. 7, 17, 27, 37.) and the low digit of a second team's score is a 3 (e.g. 3, 13, 23, 33.) at a predetermined point during the feature event. If the player is participating from a remote location, an electronic ticket or other entry verification may be provided as described herein.

The gaming unit's display unit 70 or the remote display 46 may display the numbering of remaining entries for a particular gaming pool, but typically will not show the particular entries that are still available. Thus, the player may be enticed to continue play on the primary game to win additional entries into the gaming pool. This may be accomplished by querying the player for an additional wager (block 264). If it is determined at the block 264 that the player wants to continue playing the primary game, he is directed back to the primary game at block 256. If it is determined at the block 264 that no additional wager is desired, a first gaming pool may be closed prior to the start of the feature event. The first gaming pool may, for example, pertain to the scores of the teams at the close of the first quarter. Alternatively, the first gaming pool may correspond to the scores of the teams at the conclusion of the feature event. If all of the entries in the gaming pool have not been issued, the gaming establishment may have the option of 'purchasing' the remaining tickets to ensure that all possible entries are sold.

The feature event may then be displayed proximate the gaming units associated with the first gaming pool for the feature event (block 266). For example, the feature event may be displayed on a number of television monitors, the remote display 46, or on the display units 70 of the gaming units. During exhibition of the feature event, one or more outcomes of the feature event may be determined by the bonus controller 44. This may include monitoring an outcome of future or current feature event or retrieving data associated with a feature event that occurred in the past.

Gaming establishments may run added incentive programs to keep players in the gaming establishment during the event, which may be displayed therein. For example, a gaming establishment may award free food, drink or other merchandise to the player holding the 'currently winning' ticket at the end of each 20 minute period during the feature event. In an effort to encourage players to remain in the establishment during the feature event, a gaming establishment may increase the award to the prize holder, for example by $50, if the holder of the winning ticket is in the gaming establishment when the feature event ends. Alternatively and optionally, during the feature event, the gaming establishment may provide additional opportunities to place a wager on the feature event such as, for example, providing a second gaming pool associated with the feature event (block 270). If it is determined at the block 270 that additional wagers are desired, the player may be returned to the primary game at block 256. If, however, it is determined at the block 270 that no additional wagers are desired, the routine may determine if there was at least one based on the outcome of the feature event (block 272).

If it is determined at the block 272 that a player's "wager" on the feature event was not successful, the process may begin over for that player by placing another wager with the primary gaming unit at block 256. If no player holds the issued ticket, the gaming establishment may elect to make no award and keep all wagers or the money may be rolled into a progressive jackpot for a subsequent gaming pool. Alternatively, if no issued ticket wins, all of the issued tickets may be deemed to be worth $5 each (the intrinsic value of each entry) and a player may take his non-winning ticket to any of the gaming units and insert it into the ticket reader 56 which reads the bar code on the ticket. After validating the ticket, the gaming unit may give the player the option of receiving a 20 credit award (which he can either cash out or use for further wagering) or receiving one free entry in the next gaming pool.

If it is determined at the block 272 that a feature event wager was successful, the player may be identified based on the player's entry into the gaming pool (block 274). After identifying one or more winners, the routine 250 may transmit the bonus game data to the gaming unit(s) 20 and/or the remote display 46 (block 276). This bonus game data may include, for example, data corresponding to the number of entries qualified for the feature event bonus game, the amount accumulated in a progressive bonus pool, the odds of a player winning the feature event bonus game, etc. The bonus game data may also include video images corresponding to the play of the feature event bonus game.

After transmitting the bonus game data, the successful wager may be awarded according to a predetermined or variable payout scheme. In the event that all winning entries are 'sold', the player holding the winning entry may win $500, the maximum amount of the pool ($5 value per entry and 100 tickets sold). Alternatively, a staggered pay out of the total value of the gaming pool may be provided as described herein. If the gaming establishment 'purchased' some of the entries, the gaming establishment may make up the difference between the number of entries wagered by players and the number of unsold tickets purchased by the gaming establishment thus guaranteeing the winning player the maximum payout. If, instead, the gaming establishment does not opt to 'purchase' the remaining entries, the award amount for a winning issued ticket may equal $5 times the number of tickets issued. A player holding a winning ticket may redeem the ticket as described herein.

After the event award is made, the process starts over again at the block 256 such that the player may continue to wager with the primary gaming unit in hopes of qualifying for another upcoming feature event bonus game. Various options exist for determining the dispensation of awards that are not redeemed in a timely manner.

Figure 10:
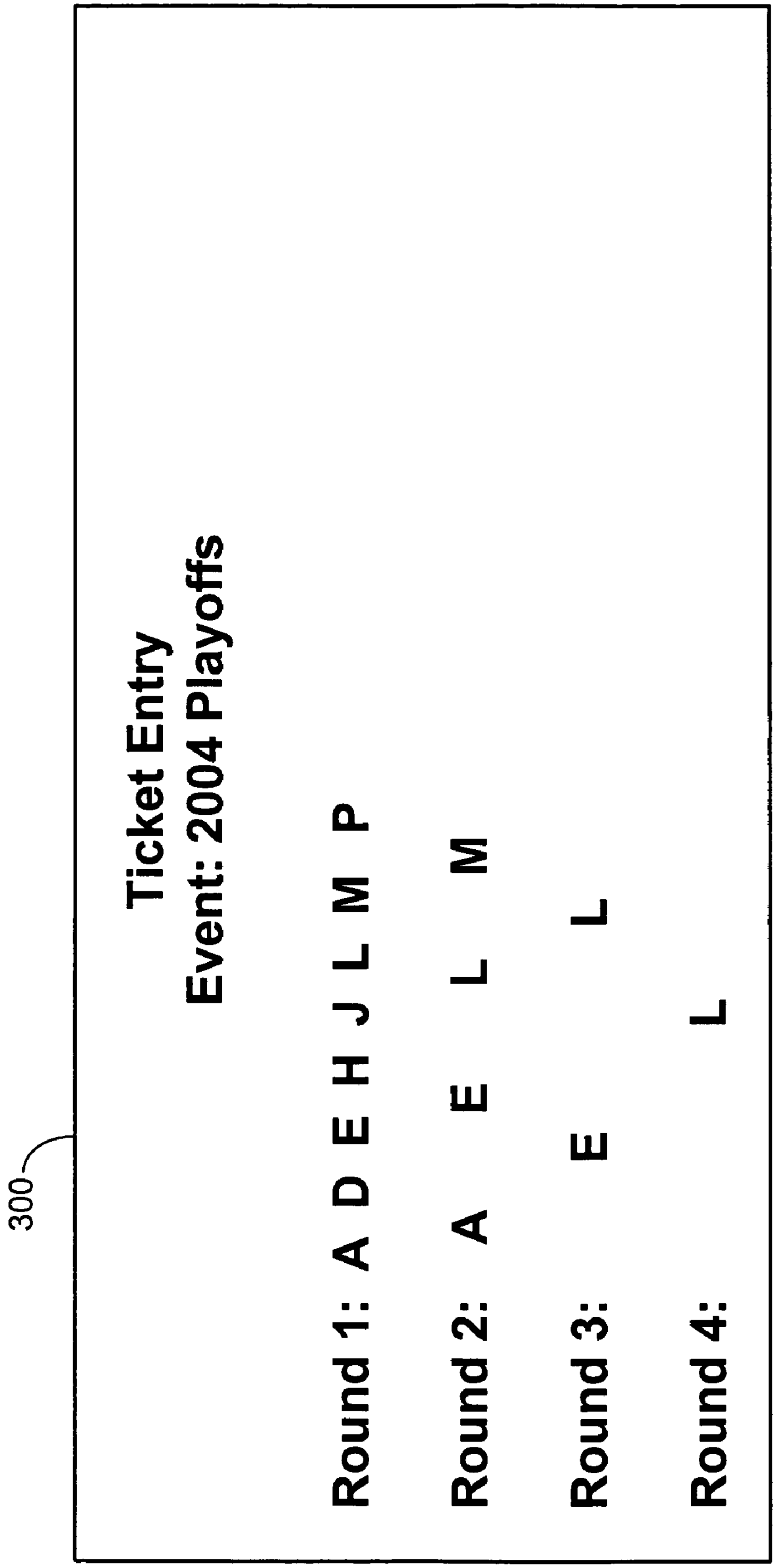
FIG. 10 is an exemplary entry ticket.

In yet another exemplary embodiment, and with reference to FIG. 10, a player may be offered the ability to win an entry into a gaming pool comprising a sports tournament/playoff that starts with sixteen teams. For reference, the teams may be referred to as A through P. In the first round of the tournament, teams are pairs of consecutively i.e., A plays B, C plays D, E plays F, etc through O plays P. In the second round, the winner of A vs. B winner plays the winner of C vs. D winner, etc. This continues for the third and fourth (final) rounds.

A sixteen-team single elimination tournament consists of fifteen individual competitions (over four rounds) in the tournament creating $2^{15}$ (32,768) possible unique entries. If the feature event is open to a large number of gaming machines or devices, a gaming establishment or event sponsor may attempt to sell all possible unique entries. During the communication with the plurality of gaming units 20, 30, the bonus controller 44 may allocate separate disjoint subsets of the available entries to each site, so that no entries may be duplicated across the system. The bonus controller 44 may also keep track of all assigned entries from each site.

If the player chooses to play a slots game on one of the gaming units 20, the game may provide a 5-line 5-reel game. Qualification may be predicated upon a player wagering on all 5 lines and receiving 5 scattered football symbols anywhere on the reels. A player may be permitted to win multiple entries, such as, for example, three scatters may qualify the player for one entry, four scatters may qualify the player for three entries, and five scatters may qualify the player for ten entries. Satisfying such qualifying activities may result in a gaming pool entry with an intrinsic value of $1. The entry may be printed on a ticket and dispensed to the player or made available to the player, for example, on the Internet.

FIG. 10 depicts one embodiment of a completed entry ticket 300 indicating which teams are needed to win in each of the four rounds in order for the player to win the gaming pool. In one embodiment, the holder of the completed entry ticket 300 may be a winner if the actual tournament outcome exactly mirrors the completed entry ticket 300. Seeding of the teams to determine which teams correspond to which letters may occur before, during, or after the entries are issued if the entries are randomly issued.

In another embodiment, players may be awarded 1 point for each round 1 winner that is correct, 2 points for each round 2 winner that is correct, 4 points for each round 3 winner that is correct, and 8 points for each round 4 (the final) winner that is correct. The total award pool may be $1 per entry issued. In one embodiment, the winner may be determined as the player who correctly matches all winners of each round.

In yet another embodiment, the player with the highest number points may be determined as the winner at the conclusion of the tournament and may be awarded 50% of the feature event bonus award. In the gaming pool, values may be determined by calculating the number of entries assigned to players multiplied by the intrinsic value of each entry. Thus, if 2000 unique entries were awarded to players of the slots game, the feature event bonus award would be $2,000.00 (2000 entries times $1 per entry). The $2^{nd}$ place player may receive 20%, the $3^{rd}$ place winner may receive 15%, the $4^{th}$ place player may receive 10%, and the $5^{th}$ place player may receive 5%. In the event of a tie among multiple players, the awards for the affected placings may be added together and split equally among the tied players. For example, if two players tie for second place, the monetary award for second and third place may be added together and the $2^{nd}$ and $3^{rd}$ place players may each be awarded 17.5%.

It is also contemplated that the bonus award may be given to the player having the highest number of points plus a progressive pool for an exact match. This scenario may be best suited for a gaming pool based upon hiting all of a specified set of given sport's games for a one week time period, Thus, the progressive may build up on a week-to-week basis if there is not an exact match. The win/loss outcomes may also be based upon a specified point spread for each competition.

It is contemplated that a four round tournament having fifteen individual competitions will occur over more than one day. Thus, the bonus controller 44 may prepare a list of the current top 15 players each day. This list may be downloaded to the gaming units 20, 30 or Internet sites for display. Prior to the conclusion of the feature event, players may insert their entry tickets into a gaming unit 20, 30 and determine their current point count. The gaming unit 20, 30 may return the entry ticket after calculating the point value.

In order to entice additional players into the tournament, feature event bonus game sponsors may establish additional gaming pools after the start of the tournament. For example, during the first round of the tournament, players may be able to win entry into a second gaming pool for the tournament directed only to the outcome of the second round of the tournament. Thus, previously qualified players as well as new players will be enticed to play the slots game throughout the tournament in an effort to attempt to qualify for another gaming pool.

In an alternative embodiment, the gaming units 20, 30 may be programmed to exhibit individual feature events, each such event being similar to the other events in contest type, requirements for qualification, and exhibition of the event. Alternatively the gaming units 20, 30 may be programmed to enter one of several different event modes as dictated by the gaming establishment or feature event bonus game sponsor. For example, one or two live contests might be displayed at specific times during a given day while re-enacted live contests may be exhibited throughout the day and activated according to alternate scheduling criteria.

Another variation of a feature event may include a grand event mode. A grand event mode may be implemented on a daily or other periodic basis wherein players who are identified as winners of a prior feature event bonus game are the only qualified individuals to participate. Thus, feature events may be run in "brackets" and a large group of players previously winning feature events narrowed down in one or several contests to two finalists competing for a grand prize. Another alternative may include periodically, or when desired, allowing gaming units in other locations the opportunity to qualify for wagering on the feature event, thereby increasing the number of potentially qualifying individuals for the upcoming feature event bonus game. Such additional gaming units may include, for example, other gaming units on the gaming establishment premises or gaming units in other gaming establishments (which may be affiliated gaming establishments or gaming establishments otherwise agreeing to participate in such an arrangement). Such gaming units may be located in a single jurisdiction or, alternatively, multiple jurisdictions such as in a wide area progressive format.

A series of exhibited feature events may be conducted so as to stimulate player interest in frequent qualification for event wagering. Of course, the grand event mode may be employed in conjunction with the concept of extending the number of participating machines so that, for example, feature event winners throughout a specified jurisdiction on a given day are entered in a grand event at a specified time each day.

Primary Games

Figure 11:
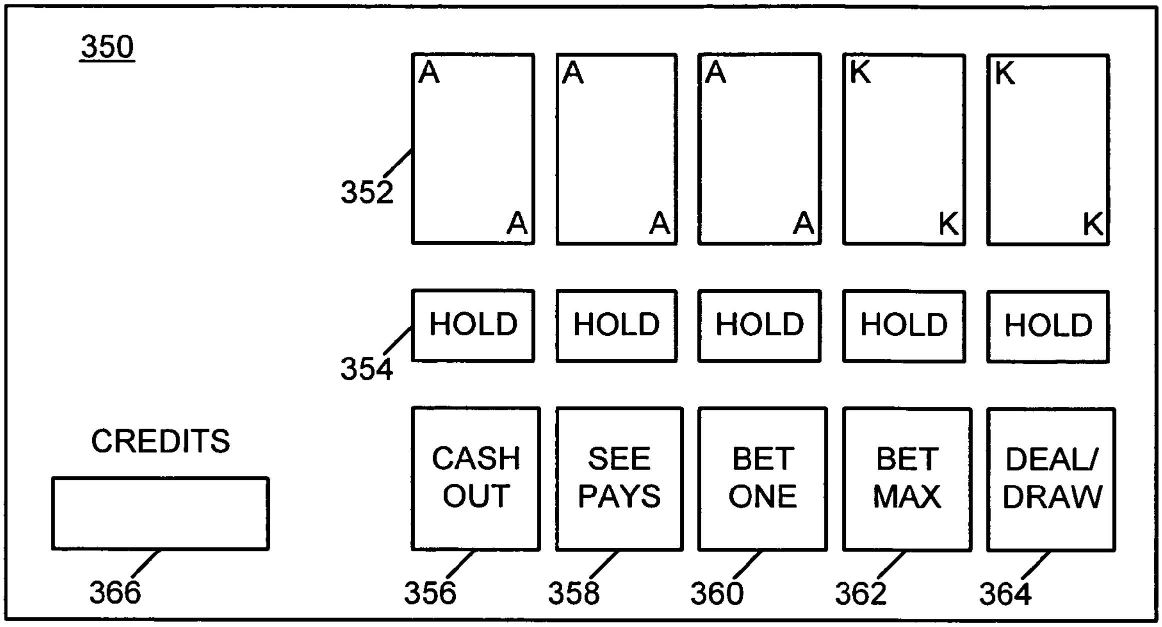
FIG. 11 is an illustration of an embodiment of a visual display that may be displayed during performance of the video poker routine of FIG. 13.

Video Poker

Where the gaming unit 20 is designed to facilitate play of a video poker game, the display unit 70 may comprise a video display unit. FIG. 11 is an exemplary display 350 that may be shown on the display unit 70 during performance of the video poker routine 142 shown schematically in FIG. 5. Referring to FIG. 11, the display 350 may include video images 352 of a plurality of playing cards representing the player's hand, such as five cards. To allow the player to control the play of the video poker game, a plurality of player-selectable buttons may be displayed. The buttons may include a "Hold" button 354 disposed directly below each of the playing card images 352, a "Cash Out" button 356, a "See Pays" button 358, a "Bet One Credit" button 360, a "Bet Max Credits" button 362, and a "Deal/Draw" button 364. The display 350 may also include an area 366 in which the number of remaining credits or value is displayed. If the display unit 70 is provided with a touch-sensitive screen, the buttons 354, 356, 358, 360, 362, 364 may form part of the video display 350. Alternatively, one or more of those buttons may be provided as part of a control panel that is provided separately from the display unit 70.

Figure 13:
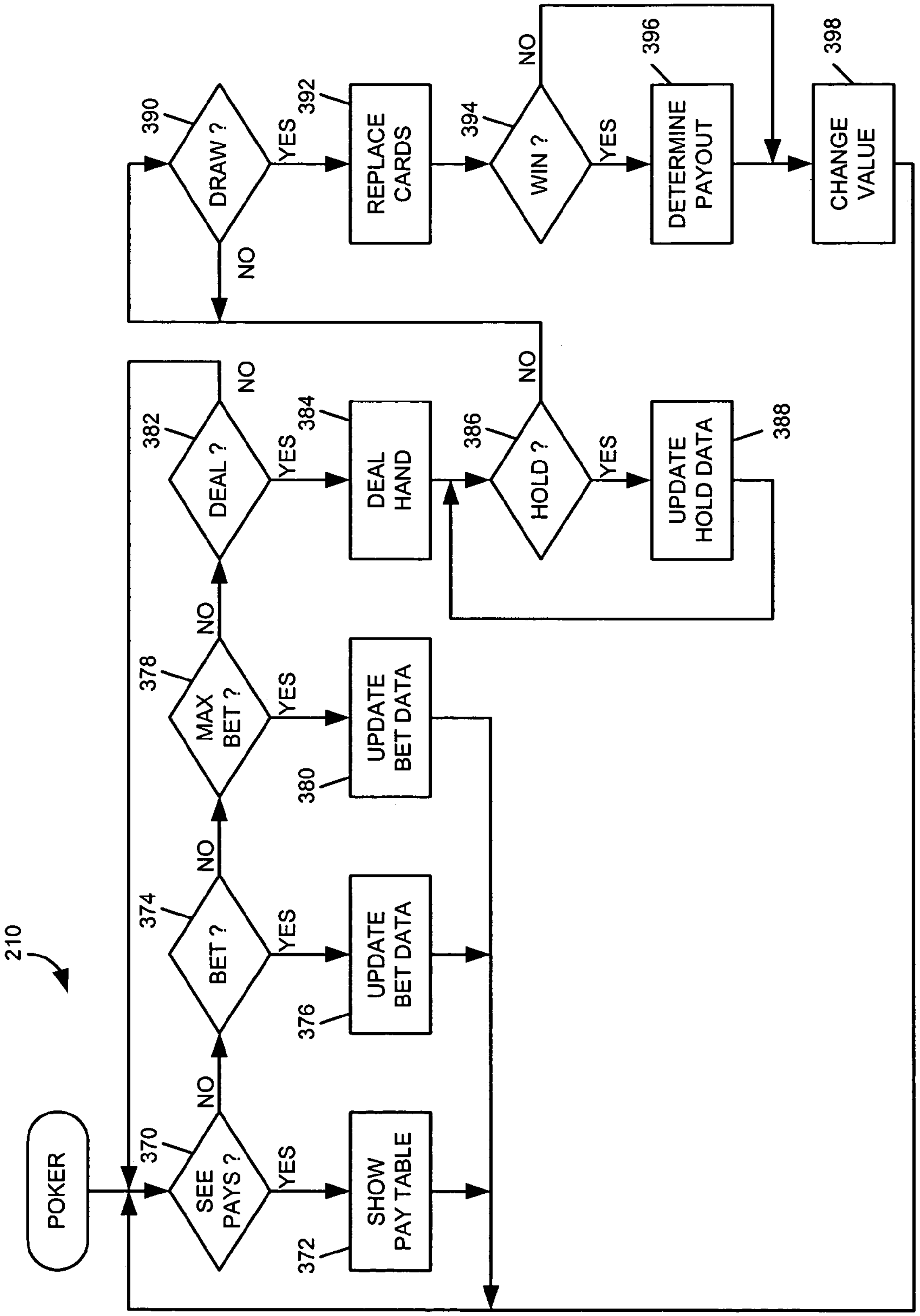
FIG. 13 is a flowchart of an embodiment of a video poker routine that may be performed by one or more of the gaming units.

FIG. 13 is a flowchart of the video poker routine 142 shown schematically in FIG. 5. Referring to FIG. 13, at block 370, the routine may determine whether the player has requested payout information, such as by activating the "See Pays" button 358, in which case at block 372 the routine may cause one or more pay tables to be displayed on the display unit 70. At block 374, the routine may determine whether the player has made a bet, such as by pressing the "Bet One Credit" button 360, in which case at block 376 bet data corresponding to the bet made by the player may be stored in the memory of the controller 100. At block 378, the routine may determine whether the player has pressed the "Bet Max Credits" button 362, in which case at block 380 bet data corresponding to the maximum allowable bet may be stored in the memory of the controller 100.

At block 382, the routine may determine if the player desires a new hand to be dealt, which may be determined by detecting if the "Deal/Draw" button 364 was activated after a wager was made. In that case, at block 384 a video poker hand may be "dealt" by causing the display unit 70 to generate the playing card images 352. After the hand is dealt, at block 386 the routine may determine if any of the "Hold" buttons 354 have been activated by the player, in which case data regarding which of the playing card images 352 are to be "held" may be stored in the controller 100 at block 388. If the "Deal/Draw" button 364 is activated again as determined at block 390, each of the playing card images 352 that were not "held" may be caused to disappear from the video display 350 and to be replaced by a new, randomly selected, playing card image 352 at block 392.

At block 394, the routine may determine whether the poker hand represented by the playing card images 352 currently displayed is a winner. That determination may be made by comparing data representing the currently displayed poker hand with data representing all possible winning hands, which may be stored in the memory of the controller 100. If there is a winning hand, a payout value corresponding to the winning hand may be determined at block 396. At block 398, the player's cumulative value or number of credits may be updated by subtracting the bet made by the player and adding, if the hand was a winner, the payout value determined at block 396. The cumulative value or number of credits may also be displayed in the display area 366 (FIG. 11).

Although the video poker routine 142 is described above in connection with a single poker hand of five cards, the routine 142 may be modified to allow other versions of poker to be played. For example, seven card poker may be played, or stud poker may be played. Alternatively, multiple poker hands may be simultaneously played. In that case, the game may begin by dealing a single poker hand, and the player may be allowed to hold certain cards. After deciding which cards to hold, the held cards may be duplicated in a plurality of different poker hands, with the remaining cards for each of those poker hands being randomly determined.

Figure 12:
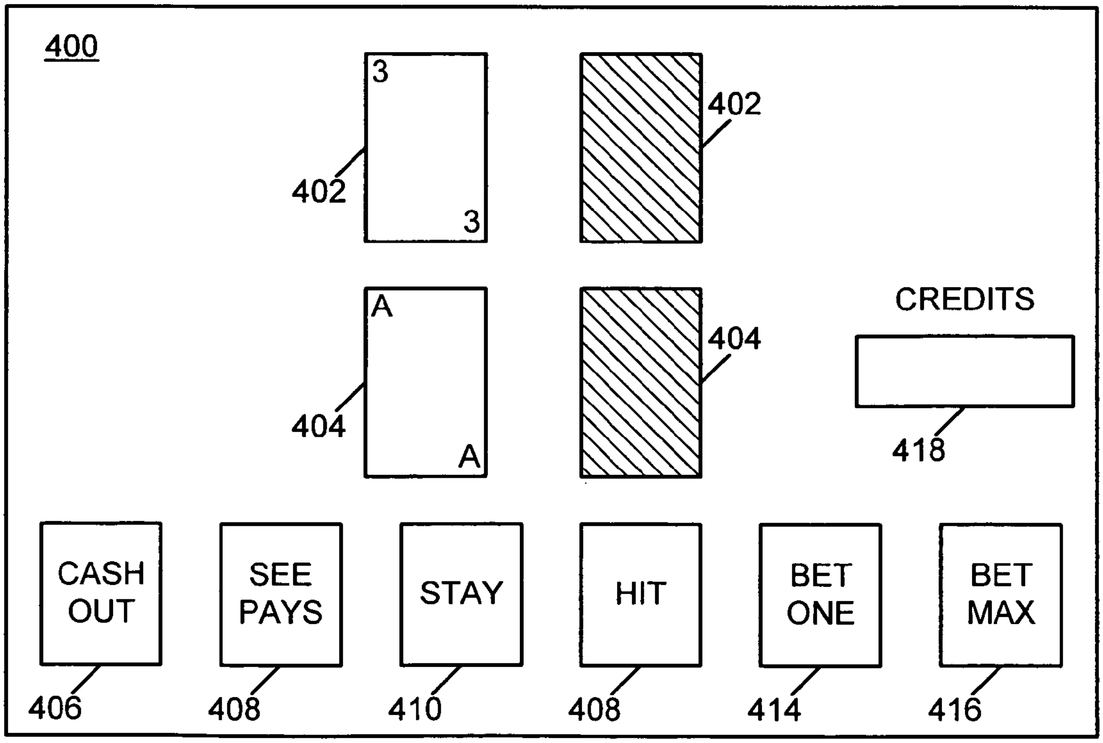
FIG. 12 is an illustration of an embodiment of a visual display that may be displayed during performance of the video blackjack routine of FIG. 14.

Video Blackjack

Where the gaming unit 20 is designed to facilitate play of a video blackjack game, the display unit 70 may comprise a video display unit. FIG. 12 is an exemplary display 400 that may be shown on the display unit 70 during performance of the video blackjack routine 144 shown schematically in FIG. 5. Referring to FIG. 12, the display 400 may include video images 402 of a pair of playing cards representing a dealer's hand, with one of the cards shown face up and the other card being shown face down, and video images 404 of a pair of playing cards representing a player's hand, with both the cards shown face up. The "dealer" may be the gaming unit 20.

To allow the player to control the play of the video blackjack game, a plurality of player-selectable buttons may be displayed. The buttons may include a "Cash Out" button 406, a "See Pays" button 408, a "Stay" button 410, a "Hit" button 412, a "Bet One Credit" button 414, and a "Bet Max Credits" button 416. The display 400 may also include an area 418 in which the number of remaining credits or value is displayed. If the display unit 70 is provided with a touch-sensitive screen, the buttons 406, 408, 410, 412, 414, 416 may form part of the video display 400. Alternatively, one or more of those buttons may be provided as part of a control panel that is provided separately from the display unit 70.

Figure 14:
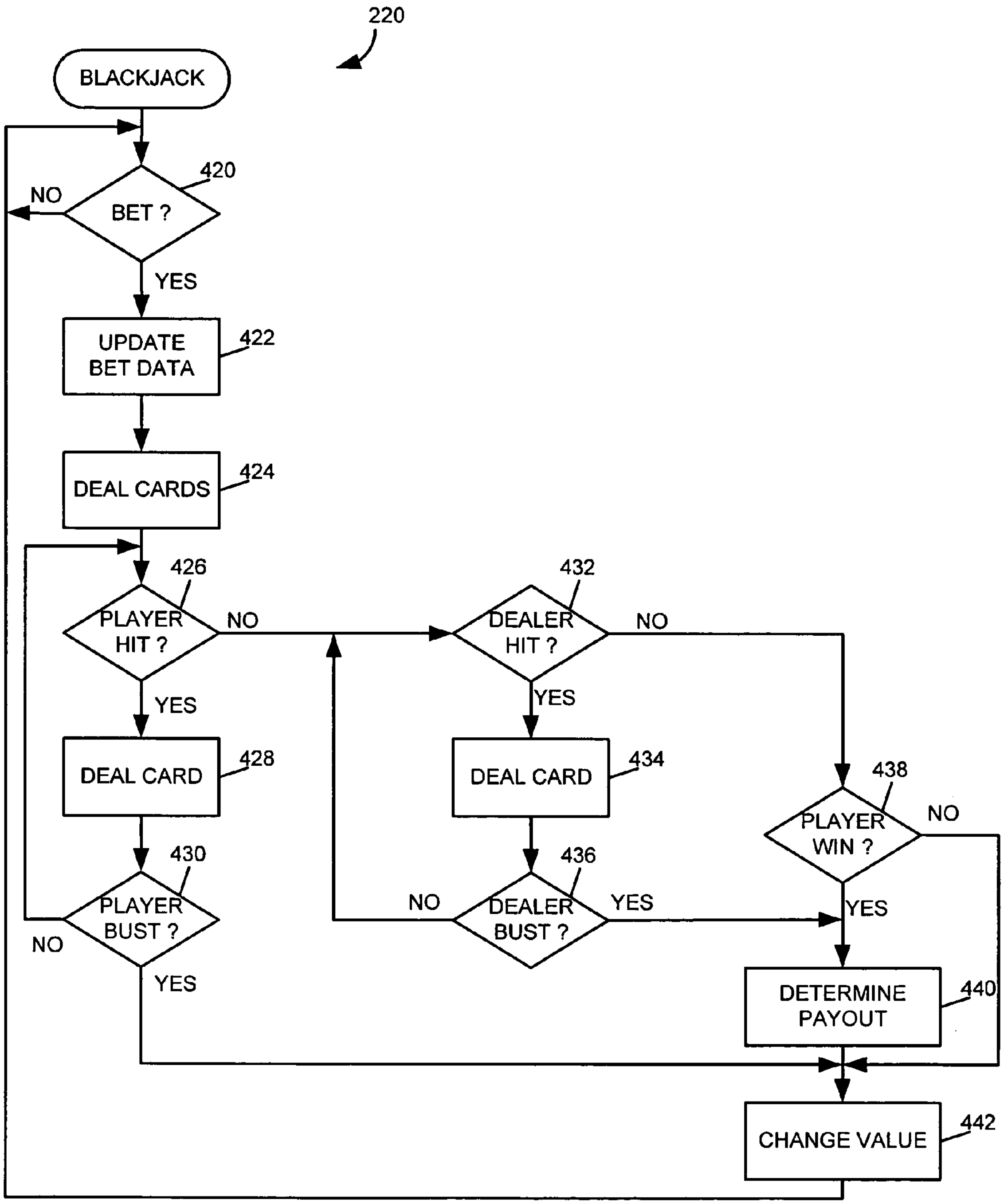
FIG. 14 is a flowchart of an embodiment of a video blackjack routine that may be performed by one or more of the gaming units.

FIG. 14 is a flowchart of the video blackjack routine 144 shown schematically in FIG. 5. Referring to FIG. 14, the video blackjack routine 144 may begin at block 420 where it may determine whether a bet has been made by the player. That may be determined, for example, by detecting the activation of either the "Bet One Credit" button 414 or the "Bet Max Credits" button 416. At block 422, bet data corresponding to the bet made at block 420 may be stored in the memory of the controller 100. At block 424, a dealer's hand and a player's hand may be "dealt" by making the playing card images 402, 404 appear on the display unit 70.

At block 426, the player may be allowed to be "hit," in which case at block 428 another card will be dealt to the player's hand by making another playing card image 404 appear in the display 400. If the player is hit, block 430 may determine if the player has "bust," or exceeded 21. If the player has not bust, blocks 426 and 428 may be performed again to allow the player to be hit again.

If the player decides not to hit, at block 432 the routine may determine whether the dealer should be hit. Whether the dealer hits may be determined in accordance with predetermined rules, such as the dealer always hit if the dealer's hand totals 15 or less. If the dealer hits, at block 434 the dealer's hand may be dealt another card by making another playing card image 402 appear in the display 400. At block 436 the routine may determine whether the dealer has bust. If the dealer has not bust, blocks 432, 434 may be performed again to allow the dealer to be hit again.

If the dealer does not hit, at block 436 the outcome of the blackjack game and a corresponding payout may be determined based on, for example, whether the player or the dealer has the higher hand that does not exceed 21. If the player has a winning hand, a payout value corresponding to the winning hand may be determined at block 440. At block 442, the player's cumulative value or number of credits may be updated by subtracting the bet made by the player and adding, if the player won, the payout value determined at block 440. The cumulative value or number of credits may also be displayed in the display area 418 (FIG. 12).

Figure 15:
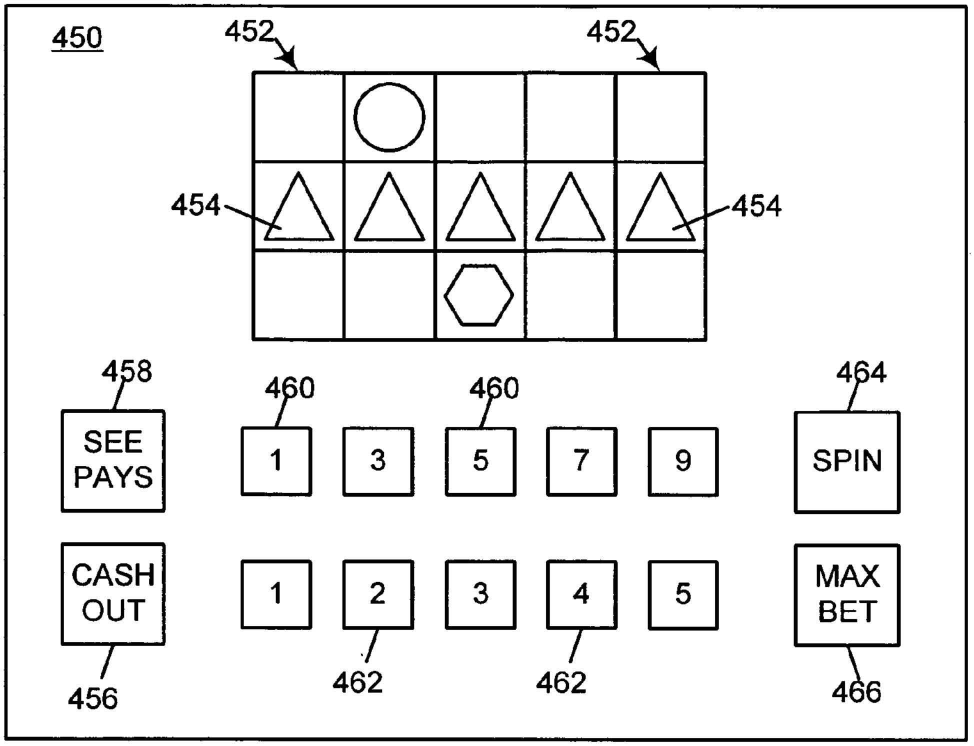
FIG. 15 is an illustration of an embodiment of a visual display that may be displayed during performance of the slots routine of FIG. 17.

Slots

Where the gaming unit 20 is designed to facilitate play of a video slots game, the display unit 70 may comprise a video display unit. FIG. 15 is an exemplary display 450 that may be shown on the display unit 70 during performance of the slots routine 146 shown schematically in FIG. 5. Referring to FIG. 15, the display 450 may include video images 452 of a plurality of slot machine reels, each of the reels having a plurality of reel symbols 454 associated therewith. Although the display 450 shows five reel images 452, each of which may have three reel symbols 454 that are visible at a time, other reel configurations could be utilized.

To allow the player to control the play of the slots game, a plurality of player-selectable buttons may be displayed. The buttons may include a "Cash Out" button 456, a "See Pays" button 458, a plurality of payline-selection buttons 460 each of which allows the player to select a different number of paylines prior to "spinning" the reels, a plurality of bet-selection buttons 462 each of which allows a player to specify a wager amount for each payline selected, a "Spin" button 464, and a "Max Bet" button 466 to allow a player to make the maximum wager allowable.

Figure 17:
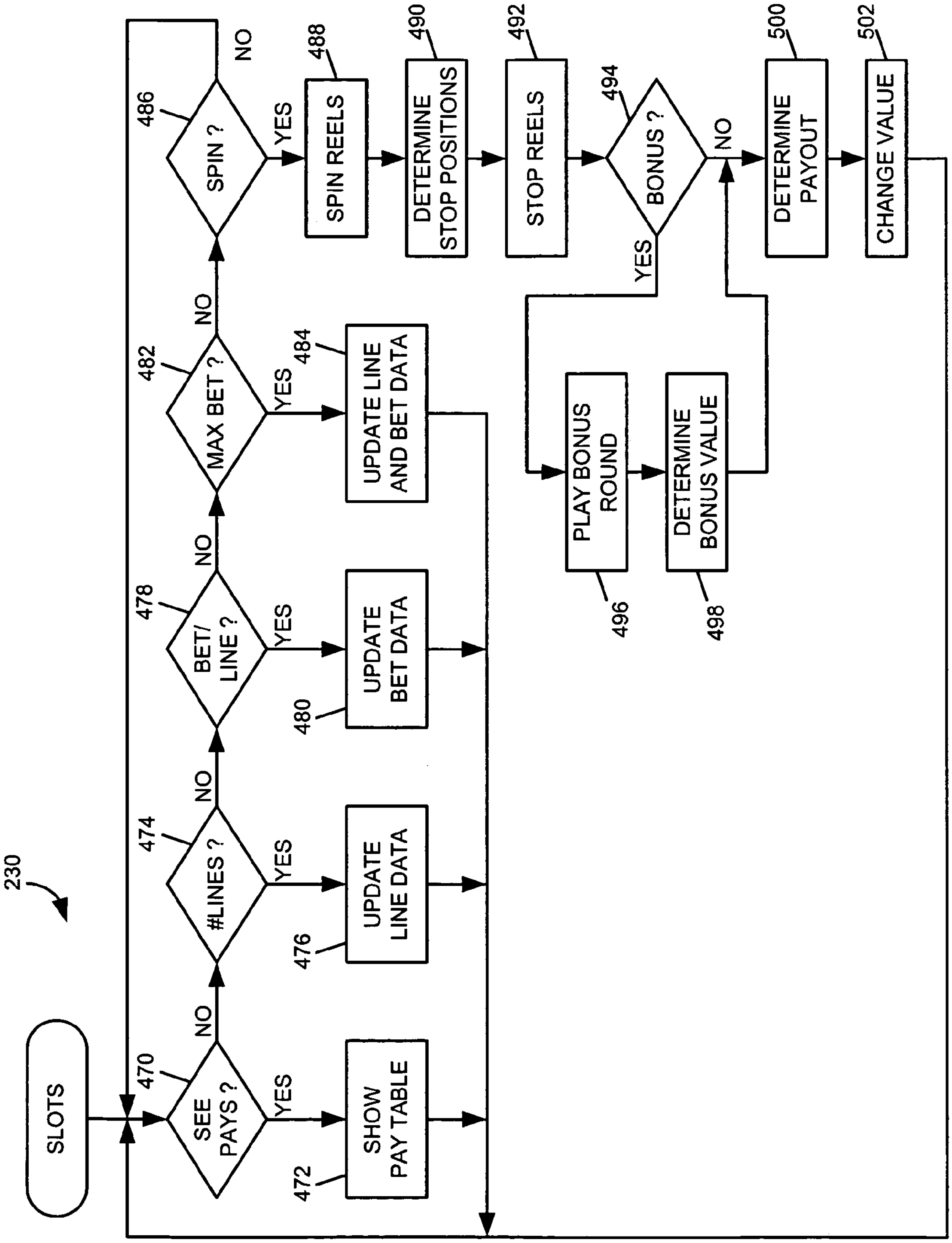
FIG. 17 is a flowchart of an embodiment of a slots routine that may be performed by one or more of the gaming units.

FIG. 17 is a flowchart of the slots routine 146 shown schematically in FIG. 15. Referring to FIG. 17, at block 470, the routine may determine whether the player has requested payout information, such as by activating the "See Pays" button 458, in which case at block 472 the routine may cause one or more pay tables to be displayed on the display unit 70. At block 474, the routine may determine whether the player has pressed one of the payline-selection buttons 460, in which case at block 476 data corresponding to the number of paylines selected by the player may be stored in the memory of the controller 100. At block 478, the routine may determine whether the player has pressed one of the bet-selection buttons 462, in which case at block 480 data corresponding to the amount bet per payline may be stored in the memory of the controller 100. At block 482, the routine may determine whether the player has pressed the "Max Bet" button 466, in which case at block 484 bet data (which may include both payline data and bet-per-payline data) corresponding to the maximum allowable bet may be stored in the memory of the controller 100.

If the "Spin" button 464 has been activated by the player as determined at block 486, at block 488 the routine may cause the slot machine reel images 452 to begin "spinning" so as to simulate the appearance of a plurality of spinning mechanical slot machine reels. At block 490, the routine may determine the positions at which the slot machine reel images will stop, or the particular symbol images 454 that will be displayed when the reel images 452 stop spinning. At block 492, the routine may stop the reel images 452 from spinning by displaying stationary reel images 452 and images of three symbols 454 for each stopped reel image 452. The virtual reels may be stopped from left to right, from the perspective of the player, or in any other manner or sequence.

The routine may provide for the possibility of a bonus game or round if certain conditions are met, such as the display in the stopped reel images 452 of a particular symbol 454. If there is such a bonus condition as determined at block 494, the routine may proceed to block 496 where a bonus round may be played. The bonus round may be a different game than slots, and many other types of bonus games could be provided. If the player wins the bonus round, or receives additional credits or points in the bonus round, a bonus value may be determined at block 498. A payout value corresponding to outcome of the slots game and/or the bonus round may be determined at block 500. At block 502, the player's cumulative value or number of credits may be updated by subtracting the bet made by the player and adding, if the slot game and/or bonus round was a winner, the payout value determined at block 500.

Although the above routine has been described as a virtual slot machine routine in which slot machine reels are represented as images on the display unit 70, actual slot machine reels that are capable of being spun may be utilized instead, in which case the display unit 70 could be provided in the form of a plurality of mechanical reels that are rotatable, each of the reels having a plurality of reel images disposed thereon.

Figure 16:
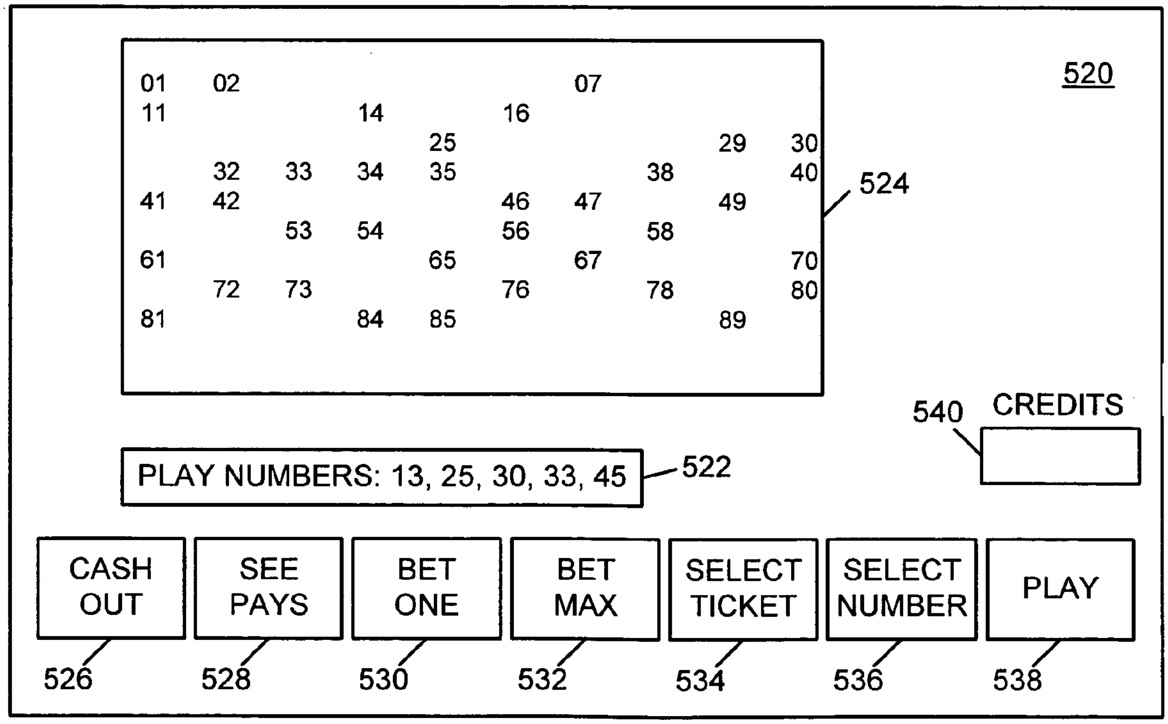
FIG. 16 is an illustration of an embodiment of a visual display that may be displayed during performance of the video keno routine of FIG. 18.

Video Keno

Where the gaming unit 20 is designed to facilitate play of a video keno game, the display unit 70 may comprise a video display unit. FIG. 16 is an exemplary display 520 that may be shown on the display unit 70 during performance of the video keno routine 148 shown schematically in FIG. 5. Referring to FIG. 16, the display 520 may include a video image 522 of a plurality of numbers that were selected by the player prior to the start of a keno game and a video image 524 of a plurality of numbers randomly selected during the keno game. The randomly selected numbers may be displayed in a grid pattern.

To allow the player to control the play of the keno game, a plurality of player-selectable buttons may be displayed. The buttons may include a "Cash Out" button 526, a "See Pays" button 528, a "Bet One Credit" button 530, a "Bet Max Credits" button 532, a "Select Ticket" button 534, a "Select Number" button 536, and a "Play" button 538. The display 520 may also include an area 540 in which the number of remaining credits or value is displayed. If the display unit 70 is provided with a touch-sensitive screen, the buttons may form part of the video display 520. Alternatively, one or more of those buttons may be provided as part of a control panel that is provided separately from the display unit 70.

Figure 18:
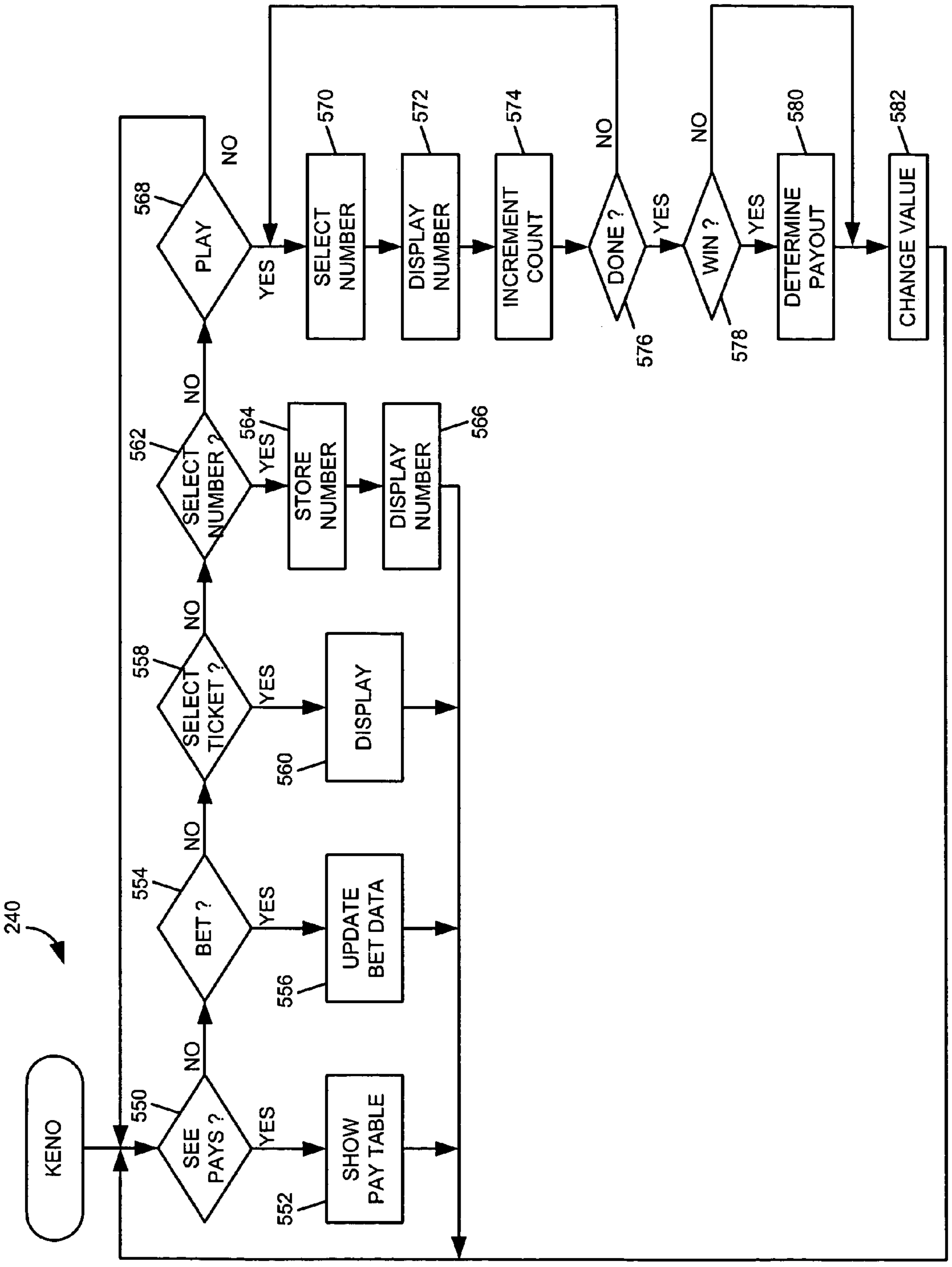
FIG. 18 is a flowchart of an embodiment of a video keno routine that may be performed by one or more of the gaming units.

FIG. 18 is a flowchart of the video keno routine 148 shown schematically in FIG. 5. The keno routine 148 may be utilized in connection with a single gaming unit 20 where a single player is playing a keno game, or the keno routine 148 may be utilized in connection with multiple gaming units 20 where multiple players are playing a single keno game. In the latter case, one or more of the acts described below may be performed either by the controller 100 in each gaming unit or by one of the network computer 22, 32 to which multiple gaming units 20 are operatively connected.

Referring to FIG. 18, at block 550, the routine may determine whether the player has requested payout information, such as by activating the "See Pays" button 528, in which case at block 552 the routine may cause one or more pay tables to be displayed on the display unit 70. At block 554, the routine may determine whether the player has made a bet, such as by having pressed the "Bet One Credit" button 530 or the "Bet Max Credits" button 532, in which case at block 556 bet data corresponding to the bet made by the player may be stored in the memory of the controller 100. After the player has made a wager, at block 558 the player may select a keno ticket, and at block 560 the ticket may be displayed on the display 520. At block 562, the player may select one or more game numbers, which may be within a range set by the casino. After being selected, the player's game numbers may be stored in the memory of the controller 100 at block 564 and may be included in the image 522 on the display 520 at block 566. After a certain amount of time, the keno game may be closed to additional players (where a number of players are playing a single keno game using multiple gambling units 20).

If play of the keno game is to begin as determined at block 568, at block 570 a game number within a range set by the casino may be randomly selected either by the controller 100 or a central computer operatively connected to the controller, such as one of the network computers 22, 32. At block 572, the randomly selected game number may be displayed on the display unit 70 and the display units 70 of other gaming units 20 (if any) which are involved in the same keno game. At block 574, the controller 100 (or the central computer noted above) may increment a count which keeps track of how many game numbers have been selected at block 570.

At block 576, the controller 100 (or one of the network computers 22, 32) may determine whether a maximum number of game numbers within the range have been randomly selected. If not, another game number may be randomly selected at block 570. If the maximum number of game numbers has been selected, at block 578 the controller 100 (or a central computer) may determine whether there are a sufficient number of matches between the game numbers selected by the player and the game numbers selected at block 570 to cause the player to win. The number of matches may depend on how many numbers the player selected and the particular keno rules being used.

If there are a sufficient number of matches, a payout may be determined at block 580 to compensate the player for winning the game. The payout may depend on the number of matches between the game numbers selected by the player and the game numbers randomly selected at block 570. At block 582, the player's cumulative value or number of credits may be updated by subtracting the bet made by the player and adding, if the keno game was won, the payout value determined at block 580. The cumulative value or number of credits may also be displayed in the display area 540 (FIG. 16).

Figure 19:
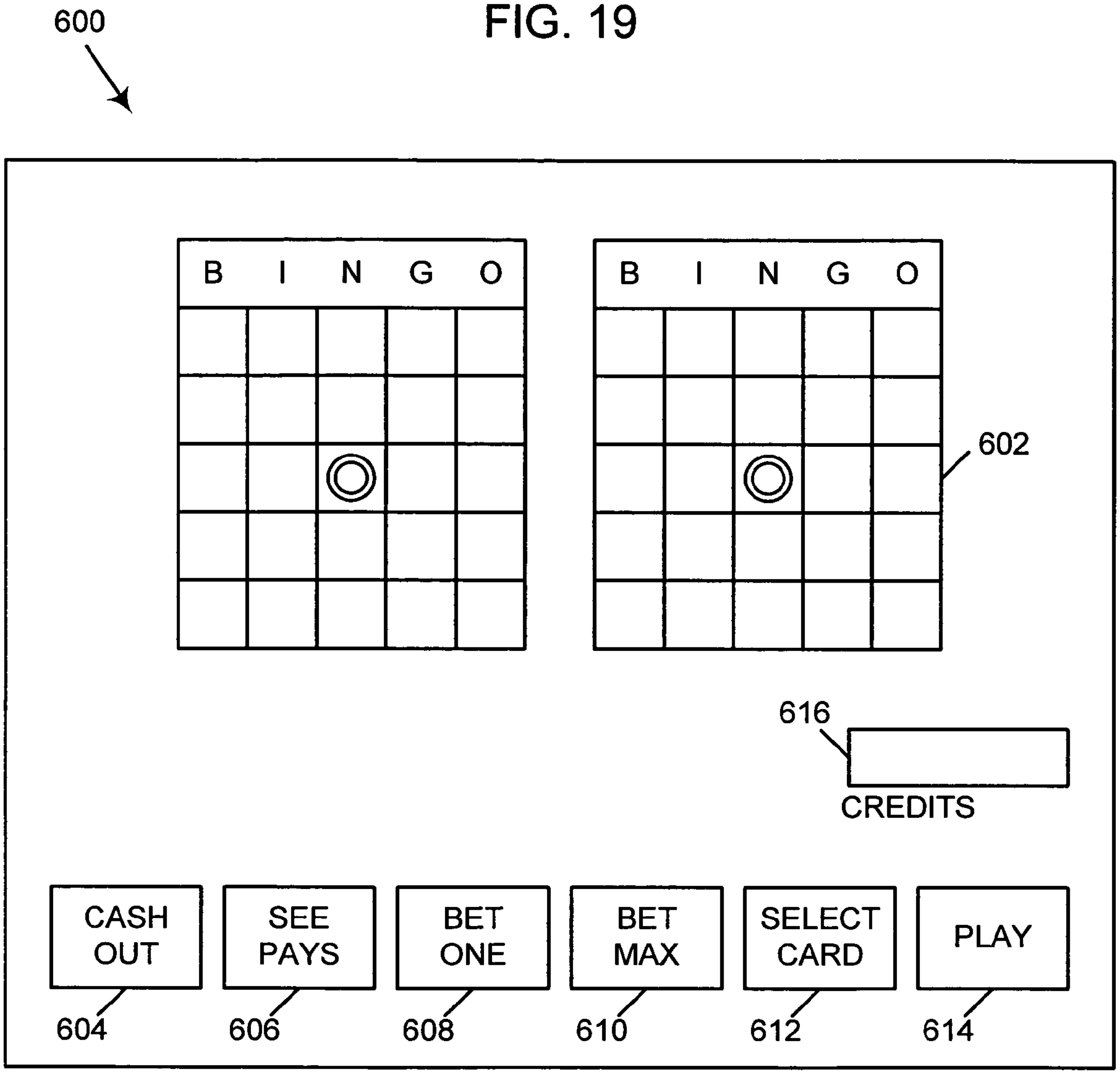
FIG. 19 is an illustration of an embodiment of a visual display that may be displayed during performance of the video bingo routine of FIG. 20.

Video Bingo

Where the gaming unit 20 is designed to facilitate play of a video bingo game, the display unit 70 may comprise a video display unit. FIG. 19 is an exemplary display 600 that may be shown on the display unit 70 during performance of the video bingo routine 150 shown schematically in FIG. 5. Referring to FIG. 19, the display 600 may include one or more video images 602 of a bingo card and images of the bingo numbers selected during the game. The bingo card images 602 may have a grid pattern.

To allow the player to control the play of the bingo game, a plurality of player-selectable buttons may be displayed. The buttons may include a "Cash Out" button 604, a "See Pays" button 606, a "Bet One Credit" button 608, a "Bet Max Credits" button 610, a "Select Card" button 612, and a "Play" button 614. The display 600 may also include an area 616 in which the number of remaining credits or value is displayed. If the display unit 70 is provided with a touch-sensitive screen, the buttons may form part of the video display 600. Alternatively, one or more of those buttons may be provided as part of a control panel that is provided separately from the display unit 70.

Figure 20:
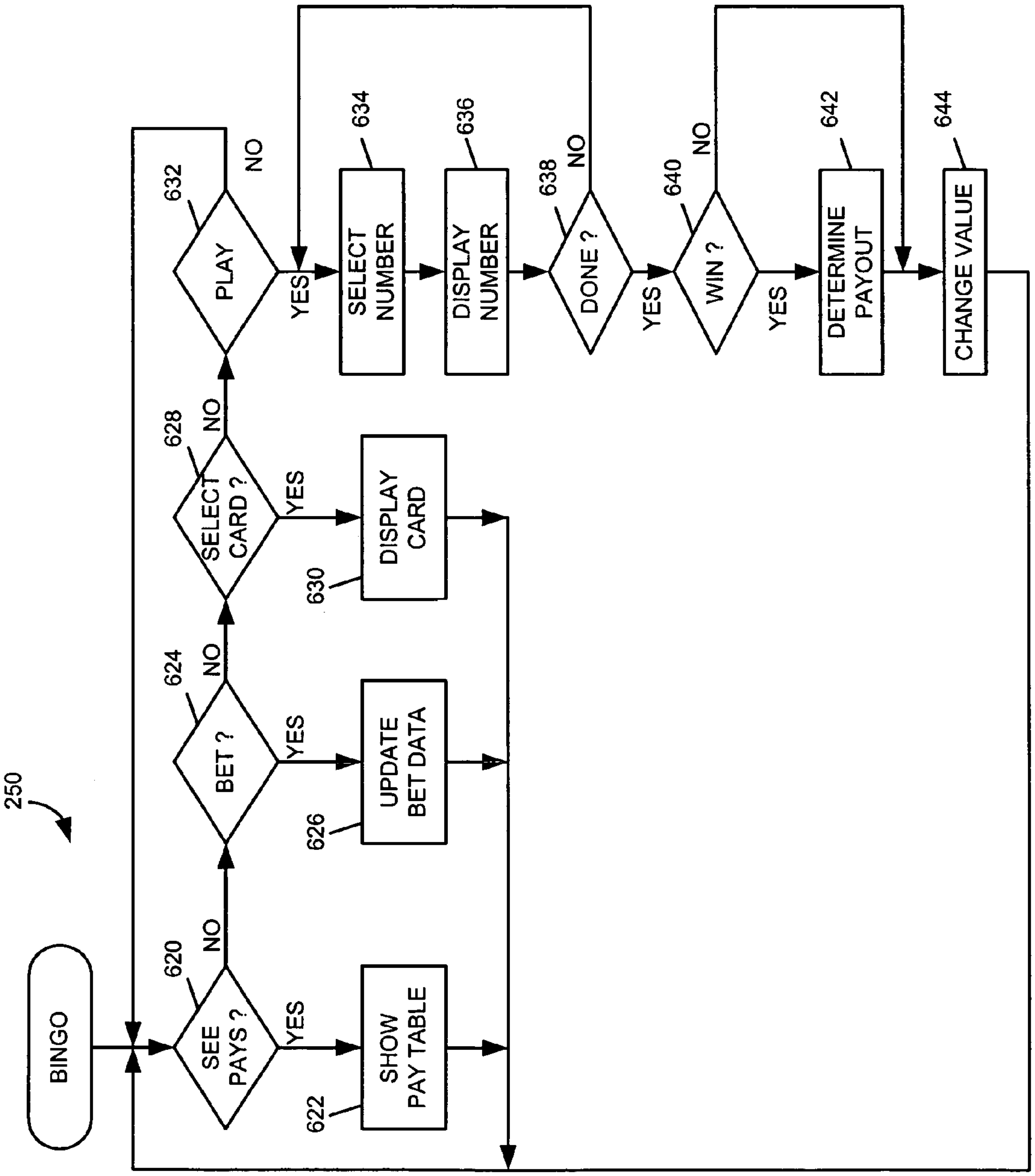
FIG. 20 is a flowchart of an embodiment of a video bingo routine that may be performed by one or more of the gaming units.

FIG. 20 is a flowchart of the video bingo routine 150 shown schematically in FIG. 5. The bingo routine 150 may be utilized in connection with a single gaming unit 20 where a single player is playing a bingo game, or the bingo routine 150 may be utilized in connection with multiple gaming units 20 where multiple players are playing a single bingo game. In the latter case, one or more of the acts described below may be performed either by the controller 100 in each gaming unit 20 or by one of the network computers 22, 32 to which multiple gaming units 20 are operatively connected.

Referring to FIG. 20, at block 620, the routine may determine whether the player has requested payout information, such as by activating the "See Pays" button 606, in which case at block 622 the routine may cause one or more pay tables to be displayed on the display unit 70. At block 624, the routine may determine whether the player has made a bet, such as by having pressed the "Bet One Credit" button 608 or the "Bet Max Credits" button 610, in which case at block 626 bet data corresponding to the bet made by the player may be stored in the memory of the controller 100.

After the player has made a wager, at block 628 the player may select a bingo card, which may be generated randomly. The player may select more than one bingo card, and there may be a maximum number of bingo cards that a player may select. After play is to commence as determined at block 632, at block 634 a bingo number may be randomly generated by the controller 100 or a central computer such as one of the network computers 22, 32. At block 636, the bingo number may be displayed on the display unit 70 and the display units 70 of any other gaming units 20 involved in the bingo game.

At block 638, the controller 100 (or a central computer) may determine whether any player has won the bingo game. If no player has won, another bingo number may be randomly selected at block 634. If any player has bingo as determined at block 638, the routine may determine at block 640 whether the player playing that gaming unit 20 was the winner. If so, at block 642 a payout for the player may be determined. The payout may depend on the number of random numbers that were drawn before there was a winner, the total number of winners (if there was more than one player), and the amount of money that was wagered on the game. At block 644, the player's cumulative value or number of credits may be updated by subtracting the bet made by the player and adding, if the bingo game was won, the payout value determined at block 642. The cumulative value or number of credits may also be displayed in the display area 616 (FIG. 19).

What is claimed is:

1. A gaming system for providing a future sporting event bonus game, comprising:

a first gaming apparatus comprising:

a game display unit;

a value input device;

a controller operatively coupled to said game display unit and said value input device, said controller comprising a processor and a memory operatively coupled to said processor, said controller being programmed to cause said game display unit to generate a game display relating to one of the following games: poker, blackjack, slots, keno or bingo, said controller being programmed to determine a value payout associated with an outcome of said game;

a second gaming apparatus operatively coupled to said first gaming apparatus;

a bonus controller operatively coupled to said first and second gaming apparatuses, said bonus controller comprising a processor and a memory operatively coupled to said processor of said bonus controller, said bonus controller being programmed to receive bonus data from said first and second gaming apparatuses, said bonus controller being programmed to assign an entry to a player at said first gaming apparatus from a plurality of entries defining a gaming pool for said future sporting event bonus game when said player obtains a qualifying win based on said randomly determined outcome of said game of said first gaming apparatus, said bonus controller being programmed to receive an outcome of said future sporting event which is one of said entries of said plurality of entries, said outcome of said future sporting event determined based, at least in part, on a skill of a participant in said future sporting event, wherein said player is not a participant in said future sporting event, and said controller and said bonus controller do not randomly determine said outcome of said future sporting event, and said bonus controller being programmed to transmit data corresponding to said outcome of said future sporting event to at least one of said first and second gaming apparatuses and a remote display.

2. A gaming system as defined in claim 1, wherein said display unit comprises a video display unit that is capable of generating video images.

3. A gaming system as defined in claim 2, wherein said controller of said first gaming apparatus is programmed to cause a video image comprising an image of at least five playing cards to be displayed if said game generated by said game display unit of said first gaming apparatus comprises video poker, wherein said controller of said first gaming apparatus is programmed to cause a video image comprising an image of a plurality of simulated slot machine reels to be displayed if said game generated by said game display unit of said first gaming apparatus comprises video slots, wherein said controller of said first gaming apparatus is programmed to cause a video image comprising an image of a plurality of playing cards to be displayed if said game comprises video blackjack, wherein said controller of said first gaming apparatus is programmed to cause a video image comprising an image of a plurality of keno numbers to be displayed if said game generated by said game display unit of said first gaming apparatus comprises video keno, and wherein said controller of said first gaming apparatus is programmed to cause a video image comprising an image of a bingo grid to be displayed if said game generated by said game display unit of said first gaming apparatus comprises video bingo.

4. The gaming system of claim 1, wherein said game display unit comprises at least one mechanical slot machine reel.

5. The gaming system of claim 1, wherein said receiving said outcome comprises monitoring the outcome of the future sporting event.

6. The gaming system of claim 1, wherein said bonus controller programmed to receive said outcome comprises said bonus controller being programmed to monitor said future sporting event and determine which player a future sporting event bonus award is awarded, said future sporting event bonus award associated with said outcome of said future sporting event.

7. The gaming system of claim 1, wherein said bonus controller is programmed to determine a type of qualifying outcome corresponding to said outcome of said game generated by said game display unit of said first gaming apparatus.

8. The gaming system of claim 1, wherein said bonus controller is programmed to provide said player a second chance to obtain a qualifying win and earn a second entry in said gaming pool.

9. The gaming system of claim 1, wherein said bonus controller is programmed to receive additional wagering from said first gaming apparatus and to enter said player into a second gaming pool for said future sporting event bonus game.

10. The gaming system of claim 1, wherein said bonus controller is programmed to generate a tournament bracket for said gaming pool, wherein said assigning said entry to said player comprises assigning said player at least one entry into a complete tournament bracket for said gaming pool.

11. The gaming system of claim 10, wherein said bonus controller is programmed to one of, allow said player to select an entry to be assigned in said tournament bracket, or randomly select for said player an entry in said tournament bracket.

12. The gaming system of claim 1, wherein said bonus controller is programmed to allow said player to defer said entry into said gaming pool for use in a subsequent gaming pool.

13. The gaming system of claim 1, wherein said bonus controller is programmed to generate an entry ticket for said gaming pool after assigning the entry to said player.

14. The gaming system of claim 13, wherein said bonus controller is programmed to either allow said player to select the entry of said future sporting event bonus game to be assigned, or assign said player the entry of said future sporting event bonus game without any input from said player.

15. The gaming system of claim 1, wherein said first and second gaming apparatuses are interconnected via an Internet.

16. A gaming system for providing a future sporting event bonus game comprising:

a first gaming apparatus comprising:

a display unit;

a value input device;

a controller operatively coupled to said display unit and said value input device, said controller comprising a processor and a memory operatively coupled to said processor of said first gaming apparatus, said controller being programmed to receive data representing a payline selection made by a first player, said controller being programmed to cause a game display to be generated by said display unit, said game display comprising images of a plurality of slot machine symbols each of which is associated with a respective slot machine reel, said controller being programmed to determine a value payout associated with an outcome of said slots game, said controller being programmed to determine said outcome of said slots game based on a first randomly generated configuration of said slot machine symbols;

a second gaming apparatus operatively coupled to said first gaming apparatus, said second gaming apparatus comprising:

a display unit;

a value input device;

a controller operatively coupled to said display unit and said value input device, said controller comprising a processor and a memory operatively coupled to said processor of said second gaming apparatus, said controller being programmed to receive data representing a payline selection made by a second player, said controller being programmed to cause a game display to be generated by said display unit, said game display comprising images of a plurality of slot machine symbols each of which is associated with a respective slot machine reel, said controller being programmed to determine a value payout associated with an outcome of said slots game, said controller being programmed to determine said outcome of said slots game based on a randomly generated configuration of said slot machine symbols;

a bonus controller operatively coupled to said first and second gaming apparatuses, said bonus controller comprising a processor and a memory operatively coupled to said processor of bonus controller, said bonus controller being programmed to receive bonus data from said first and second gaming apparatuses, said bonus controller being programmed to assign an entry to said player at said first gaming apparatus from a plurality of entries defining a gaming pool for said future sporting event bonus game when said player obtains a qualifying win based on the randomly generated configuration of said slot machine symbols of said slots game, said bonus controller being programmed to receive an outcome of said future sporting event, said outcome of said future sporting event determined based, at least in part, on a skill of a participant in said future sporting event, wherein said player is not a participant in said future sporting event, and said controllers and said bonus controller do not randomly determine said outcome of said future sporting event, said bonus controller being programmed to determine if at least one winner exists based on said outcome of said future sporting event;

said bonus controller being programmed to identify said at least one winner of said future sporting event bonus game if said at least one winner exists, said at least one winner being identified based on said entry assigned to said player at said first gaming apparatus, and said bonus controller being programmed to transmit data corresponding to said outcome of said future sporting event bonus game to at least one of said first and second gaming apparatuses and a remote display unit.

17. The gaming system of claim 16, wherein said display units of said first and second gaming apparatuses comprise a video display units that are capable of generating video images.

18. The gaming system of claim 17, wherein said controllers of said first and second gaming apparatuses are programmed to cause video images comprising images of a plurality of simulated slot machine reels to be displayed on said display units.

19. The gaming system of claim 16, wherein said display units of said first and second gaming apparatuses comprise at least one mechanical slot machine reel.

20. The gaming system of claim 16, wherein said controllers of said first and second gaming apparatuses are programmed to receive payline data representing a number of paylines selected by said first and second players.

21. The gaming system of claim 16, wherein said qualifying win includes at least one of the following:

said first and second players play said first game and obtain a specific outcome, said first and second players play said first game and obtain a plurality of specific outcomes, said first and second players play said first game a designated number of times, said first and second players play said first game for a designated duration of time, and said first and second players play said first game a plurality of times and wager a designated sum of money over said plurality of times.

22. The gaming system of claim 16, wherein said bonus controller is programmed to assign a value to each of said plurality of entries in said gaming pool, said value multiplied by a total number of entries in said gaming pool equaling a future sporting event bonus award.

23. The gaming system of claim 16, wherein said bonus controller is programmed to assign a value to each of said plurality of entries in said gaming pool, said value multiplied by a total number of possible entries in said gaming pool equaling a future sporting event bonus award.

24. The gaming system of claim 16, wherein said bonus controller is programmed to assign any unassigned entries in said gaming pool to a sponsor of said gaming pool.

25. The gaming system of claim 16, wherein said bonus controller is programmed to enable any player who is assigned an entry into said gaming pool to predict the outcome of said future sporting event and determine whether at least one player exactly predicted the outcome of said future sporting event.

26. The gaming system of claim 16, wherein said bonus controller is programmed to enable any player who is assigned an entry into said gaming pool to predict the outcome of said future sporting event and identify a player who most closely predicted the outcome of said future sporting event.

27. A bonus controller for managing a future sporting event bonus game in a gaming system, said bonus controller comprising:

a processor;

a memory operatively coupled to said processor;

said bonus controller being programmed to receive bonus data corresponding to a game selected from one of the following games: poker, blackjack, slots, keno or bingo, said bonus controller being programmed to assign an entry to a player associated with a first gaming apparatus from a plurality of entries defining a gaming pool for said future sporting event bonus game when said player obtains a randomly determined qualifying win at one of said games, said bonus controller being programmed to determine an outcome of said future sporting event bonus game, said outcome of said future sporting event bonus game determined based, at least in part, on a skill of a participant in a future sporting event, wherein said player is not a participant in said future sporting event, and said bonus controller does not randomly determine said outcome of said future sporting event, said bonus controller being programmed to determine if at least one winner exists based on said outcome of said future sporting event bonus game, said bonus controller being programmed to identify said at least one winner of said future sporting event bonus game, and said bonus controller being programmed to transmit data corresponding to said outcome of said future sporting event bonus game.

28. The bonus controller of claim 27, wherein said bonus controller is programmed to:

determine a type of randomly determined qualifying win corresponding to said game selected from one of said games: poker, blackjack, slots, keno or bingo, and assign said player said entry based on said type of qualifying outcome.

29. The bonus controller of claim 27, wherein said randomly determined qualifying win includes at least one of the following:

said player plays said game and obtains a specific outcome, said player plays said game and obtains a plurality of specific outcomes, said player plays said game a designated number of times, said player plays said game for a designated duration of time, and said player plays said game a plurality of times and wagers a designated sum of money over said plurality of times.

30. The bonus controller of claim 27, wherein said bonus controller is programmed to enable any player who is assigned an entry into said gaming pool to predict the outcome of said future sporting event and associate a future sporting event bonus award associated with said future sporting event with a second gaming pool if no players assigned an entry in said gaming pool exactly predict the outcome of said future sporting event.

31. The bonus controller of claim 27, wherein said bonus controller is programmed to generate and cause a display of a plurality of cells, which form said gaming pool, wherein each cell is associated with a unique outcome of said future sporting event, and offering said player at least one cell of said plurality of cells when assigning said entry to said player at said first gaming apparatus.

32. A gaming method, comprising:

(a) causing a game display of one of the following games to be generated on a display unit of a first gaming apparatus: poker, blackjack, slots, keno or bingo;

(b) causing a game display of one of the following games to be generated on a display unit of a second gaming apparatus: poker, blackjack, slots, keno or bingo;

(c) randomly determining an outcome of said game represented by said game display generated on said display unit of said first gaming apparatus;

(d) transmitting bonus data from said first gaming apparatus to a bonus controller;

(e) determining if said randomly determined outcome of said game is a qualifying outcome for a future sporting event bonus game;

(f) qualifying a player at said first gaming apparatus for said future sporting event bonus game if said randomly determined outcome is a qualifying outcome;

(g) assigning an entry to said qualified player from a plurality of entries defining a gaming pool for said future sporting event bonus game;

(h) determining a winner of said future sporting event bonus game, said winner of said future sporting event bonus game determined based, at least in part, on a skill of a participant in a future sporting event, wherein said qualified player is not a participant in said future sporting event, and said bonus controller does not randomly determine said winner of said future sporting event;

(i) transmitting display data associated with said future sporting event bonus game from said bonus controller to a display unit; and (j) determining a value payout associated with a future sporting event bonus award associated with said future sporting event bonus game.

33. The gaming method of claim 32, additionally comprising: generating and displaying a plurality of cells, which form said gaming pool, wherein each cell is associated with a unique outcome of said future sporting event, and offering said player at least one cell of said plurality of cells.

34. The gaming method of claim 33, additionally comprising randomly assigning said player at least one cell of said plurality of cells.

35. The gaming method of claim 33, wherein said plurality of cells in said gaming pool form a matrix, said matrix including a first axis and a second axis, each of said axes including a plurality of positions, and said method additionally comprises associating said first axis of said matrix with a first contestant in said future sporting event and said second axis of said matrix with a second contestant in said future sporting event, and, for each axis of said matrix, randomly assigning a different digit between 0 and 9 to each position of said axis.

36. The gaming method of claim 33, additionally comprising determining a winning cell of said plurality of cells, and awarding a player associated with said winning cell at least a portion of a future sporting event bonus award for said gaming pool.

37. The gaming method of claim 32, additionally comprising assigning said player a plurality of entries into said gaming pool for said future sporting event bonus game.

38. The gaming method of claim 32, additionally comprising:

qualifying said player for said future sporting event bonus game when one of the following events occurs:

said player plays said game generated on said display unit of said first gaming apparatus and obtains a specific outcome, said player plays said game generated on said display unit of said first gaming apparatus and obtains a plurality of specific outcomes, said player plays said game generated on said display unit of said first gaming apparatus a designated number of times, said player plays said game generated on said display unit of said first gaming apparatus for a designated duration of time, and said player plays said game generated on said display unit of said first gaming apparatus a plurality of times and wagers a designated sum of money over said plurality of times.

39. A method of providing a gaming pool for a future sporting event bonus game in a gaming network, comprising:

(a) receiving bonus data at a bonus controller, said bonus data corresponding to play of one of the following games: poker, blackjack, slots, keno or bingo;

(b) qualifying a player for said future sporting event bonus game if a randomly determined outcome of said game is a qualifying outcome;

(c) assigning an entry to said qualified player from a plurality of entries defining said gaming pool for said future sporting event bonus game;

(d) determining a monetary value of said gaming pool;

(e) determining an outcome of a future sporting event, said outcome of said future sporting event determined based, at least in part, on a skill of a participant in said future sporting event, wherein said qualified player is not a participant in said future sporting event, and said bonus controller does not randomly determine said outcome of said future sporting event;

(f) transmitting display data associated with said future sporting event bonus game from said bonus controller to a display unit, said display unit being operatively coupled to said bonus controller; and (g) determining a value payout associated with said outcome of said future sporting event bonus game.

40. The method of claim 39, additionally comprising providing said player a second chance to obtain a qualifying win and earn a second entry into said gaming pool.

41. The method of claim 39, additionally comprising receiving additional bonus data at said bonus controller and assigning a second entry to said qualified player from a second plurality of entries defining a second gaming pool for said future sporting event bonus game.

42. The method of claim 39, additionally comprising generating a tournament bracket for said gaming pool and assigning said qualified player at least one entry from said tournament bracket.

43. A gaming system for providing a future sporting event bonus game, comprising:

a first gaming apparatus comprising:

a game display unit;

a value input device;

a controller operatively coupled to said game display unit and said value input device, said controller comprising a processor and a memory operatively coupled to said processor, said controller being programmed to cause said game display unit to generate a game display relating to one of the following games: poker, blackjack, slots, keno or bingo, said controller being programmed to determine a value payout associated with a randomly determined outcome of said game, a second gaming apparatus operatively coupled to said first gaming apparatus, said second gaming apparatus having a controller comprising a processor and a memory operatively coupled to said processor of said controller of said second gaming apparatus;

said controller of said second gaming apparatus being programmed to receive bonus data from said first gaming apparatus, said controller of said second gaming apparatus being programmed to assign an entry to a player at said first gaming apparatus from a plurality of entries defining a gaming pool for said future sporting event bonus game when said player qualifies for entry at one of said games based on said randomly determined outcome of said game of said first gaming apparatus, said controller of said second gaming apparatus being programmed to determine an outcome of said future sporting event, said outcome of said future sporting event associated with one of said entries of said plurality of entries, said outcome of said future sporting event determined based, at least in part, on a skill of a participant in said future sporting event, wherein said player is not a participant in said future sporting event, and said controller and said controller of said second gaming apparatus do not randomly determine said outcome of said future sporting event, and said controller of said second gaming apparatus being programmed to transmit data corresponding to said outcome of said future sporting event to at least one of said first gaming apparatus and a remote display.

44. A memory having a computer program stored therein, said computer program being capable of being used in connection with a bonus controller in a gaming system, said memory comprising:

a memory portion physically configured in accordance with computer program instructions that would cause said bonus controller to receive bonus data corresponding to a game, said game selected from one of the following games: poker, blackjack, slots, keno or bingo, a memory portion physically configured in accordance with computer program instructions that would cause said bonus controller to assign an entry to a player from a plurality of entries defining a gaming pool for a future sporting event bonus game when said player obtains a randomly determined qualifying win from said game, a memory portion physically configured in accordance with computer program instructions that would cause said bonus controller to determine an outcome of said future sporting event, said outcome of said future sporting event determined based, at least in part, on a skill of a participant in said future sporting event, wherein said player is not a participant in said future sporting event, and said bonus controller does not randomly determine said outcome of said future sporting event, a memory portion physically configured in accordance with computer program instructions that would cause said bonus controller to identify a winner of said future sporting event bonus game, a memory portion physically configured in accordance with computer program instructions that would cause said bonus controller to transmit display data associated with said future sporting event bonus game from said bonus controller to a display unit; and a memory portion physically configured in accordance with computer program instructions that would cause said bonus controller to determine a value payout associated with a future sporting event bonus award associated with said future sporting event bonus game.

45. The memory of claim 44, wherein, said memory additionally comprises a memory portion physically configured in accordance with computer program instructions that would cause said bonus controller to assign a value to each of said plurality of entries in said gaming pool, said value multiplied by a total number of possible entries in said gaming pool equaling said future sporting event bonus award.

46. The memory of claim 44, wherein said memory additionally comprises a memory portion physically configured in accordance with computer program instructions that would cause said bonus controller to assign any unassigned entries in said gaming pool to a sponsor of said gaming pool.

47. The memory of claim 44, wherein said memory additionally comprises a memory portion physically configured in accordance with computer program instructions that would cause said bonus controller to enable any player who is assigned an entry into said gaming pool to predict the outcome of said future sporting event and determine whether at least one player exactly predicted the outcome of said future sporting event.

* * * * *

UNITED STATES PATENT AND TRADEMARK OFFICE

CERTIFICATE OF CORRECTION

PATENT NO. : 7,666,088 B2
APPLICATION NO. : 10/951414
DATED : February 23, 2010
INVENTOR(S) : Lee E. Cannon It is certified that error appears in the above-identified patent and that said Letters Patent is hereby corrected as shown below:

In Claim 1, Column 29, line 30, insert --and-- after “bingo,”.

In Claim 1, Column 29, line 34, insert --and-- after “apparatus,”.

In Claim 16, Column 31, line 21, insert --and-- after “reel,”.

In Claim 16, Column 31, line 43, insert --and-- after “reel,”.

In Claim 16, Column 31, line 49, insert --and-- after “bols;”.

In Claim 17, Column 32, line 18, delete “a”.

In Claim 43, Column 35, line 64, insert --and-- after “bingo,”.

In Claim 43, Column 35, line 67, insert --and-- after “game,”.

Signed and Sealed this

Twentieth Day of July, 2010

David J. Kappos

David J. Kappos
*Director of the United States Patent and Trademark Office*

UNITED STATES PATENT AND TRADEMARK OFFICE
CERTIFICATE OF CORRECTION

PATENT NO. : 7,666,088 B2
APPLICATION NO. : 10/951414
DATED : February 23, 2010
INVENTOR(S) : Lee E. Cannon It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 467 days.

Signed and Sealed this

Seventh Day of December, 2010

David J. Kappos
*Director of the United States Patent and Trademark Office*